(12) United States Patent
Chiba et al.

(10) Patent No.: US 9,304,710 B2
(45) Date of Patent: *Apr. 5, 2016

(54) STORAGE SYSTEM AND DATA TRANSFER METHOD OF STORAGE SYSTEM

(71) Applicant: Hitachi, Ltd., Tokyo (JP)

(72) Inventors: Takeru Chiba, Odawara (JP); Sadahiro Sugimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,032

(22) Filed: Jun. 18, 2014

(65) Prior Publication Data

US 2014/0304482 A1 Oct. 9, 2014

Related U.S. Application Data

(63) Continuation of application No. 13/653,788, filed on Oct. 17, 2012, now Pat. No. 8,782,337, which is a continuation of application No. 12/935,902, filed as application No. PCT/JP2010/005542 on Sep. 10, 2010.

(51) Int. Cl.
*G06F 3/06* (2006.01)
*G06F 12/08* (2006.01)
*G06F 12/00* (2006.01)

(52) U.S. Cl.
CPC ............ *G06F 3/0658* (2013.01); *G06F 3/0604* (2013.01); *G06F 3/065* (2013.01);
(Continued)

(58) Field of Classification Search
CPC ..... G06F 3/0611; G06F 3/065; G06F 3/0604; G06F 3/0658; G06F 3/0659; G06F 3/0683; G06F 12/00; G06F 12/0868; G06F 2003/0697
See application file for complete search history.

(56) References Cited

U.S. PATENT DOCUMENTS 5,553,307 A  9/1996  Fujii et al.
7,213,110 B2  5/2007  Nakayama et al.
(Continued)

FOREIGN PATENT DOCUMENTS

EP  1 357 476 A2  10/2003
JP  06-028261  2/1994
(Continued)

OTHER PUBLICATIONS

PCT International Search Report and Written Opinion on application No. PCT/JP2010/005542 dated Apr. 26, 2011; 11 pages.

*Primary Examiner* — Reginald Bragdon
*Assistant Examiner* — Mehdi Namazi
(74) *Attorney, Agent, or Firm* — Foley & Lardner LLP

(57) ABSTRACT

A storage system is described and includes a storage apparatus for storing data used by an external apparatus, first and second temporary data storage units, a host interface, a disk interface, and first and second controllers. The first controller is configured to select as a data transfer process, when the host interface receives a command from the external apparatus, one of a first data transfer process and a second data transfer process based on the command. The first data transfer process is a data transfer from the first temporary data storage unit to the external apparatus by the host interface. The second data transfer process is a data transfer from the first temporary data storage unit to the second temporary data storage unit by the second controller, and a data transfer from the second temporary data storage unit to the external apparatus by the host interface.

12 Claims, 24 Drawing Sheets

(52) U.S. Cl.
CPC ........... *G06F 3/0611* (2013.01); *G06F 3/0659* (2013.01); *G06F 3/0683* (2013.01); *G06F 3/0689* (2013.01); *G06F 12/00* (2013.01); *G06F 12/0868* (2013.01); *G06F 2003/0697* (2013.01)

(56) References Cited

U.S. PATENT DOCUMENTS

| | | | |
|---|---|---|---|
| 7,243,229 | B2 | 7/2007 | Maki et al. |
| 7,711,872 | B2 | 5/2010 | Sugimoto et al. |
| 7,779,221 | B1 | 8/2010 | Tsypliaev et al. |
| 8,161,221 | B2 | 4/2012 | Shimotaya et al. |
| 8,316,195 | B2 * | 11/2012 | Chiba et al. ............... 711/154 |
| 8,782,337 | B2 * | 7/2014 | Chiba et al. ............... 711/112 |
| 2003/0123176 | A1 * | 7/2003 | Arakawa et al. ............ 360/60 |
| 2003/0188032 | A1 | 10/2003 | Solomon et al. |
| 2004/0034750 | A1 | 2/2004 | Horn |
| 2006/0277226 | A1 | 12/2006 | Chikusa et al. |
| 2008/0208861 | A1 | 8/2008 | Ray et al. |
| 2009/0067081 | A1 | 3/2009 | Sato et al. |
| 2009/0138672 | A1 | 5/2009 | Katsuragi et al. |
| 2011/0055513 | A1 | 3/2011 | Lee |
| 2012/0023290 | A1 | 1/2012 | Sugimoto et al. |
| 2013/0205088 | A1 | 8/2013 | Benhase et al. |

FOREIGN PATENT DOCUMENTS

| | | |
|---|---|---|
| JP | 2006-338461 A | 12/2006 |
| JP | 2009-064363 | 3/2009 |
| JP | 2009-129201 A | 6/2009 |

* cited by examiner

| | |
|---|---|
| TRANSFER LENGTH | 401 |
| TRANSFER TYPE INFORMATION | 402 |
| DATA STORAGE SOURCE ADDRESS | 403 |
| DATA STORAGE DESTINATION ADDRESS | 404 |
| STATUS RETURN DESTINATION ADDRESS | 405 |
| GUARANTEE CODE APPENDING FLAG | 406 |
| GUARANTEE CODE SETTING VALUE | 407 |
| GUARANTEE CODE CHECKING FLAG | 408 |
| GUARANTEE CODE EXPECTATION VALUE | 409 |

DISK I/F TRANSFER TABLE

PROCESS TO DETERMINE WHETHER DIRECT TRANSFER IS EXECUTABLE OR NOT

PROCESS TO DETERMINE WHETHER DIRECT TRANSFER IS EXECUTABLE OR NOT

STORAGE SYSTEM AND DATA TRANSFER METHOD OF STORAGE SYSTEM

CROSS-REFERENCE TO RELATED PATENT APPLICATIONS

This application is a Continuation of U.S. application Ser. No. 13/653,788, filed Oct. 17, 2012, incorporated herein by reference in its entirety, which is a Continuation of U.S. application Ser. No. 12/935,902, now U.S. Pat. No. 8,316,195, (National Stage of PCT/JP2010/005542), filed Sep. 30, 2010, incorporated herein by reference in its entirety.

TECHNICAL FIELD

The present invention relates to a storage system and a data transfer method of a storage system, and particularly relates to a storage system and a data transfer method of a storage system that can achieve higher data I/O performance even when hardware resources are limited.

BACKGROUND ART

The importance of storage systems has been continuously increasing in today's information society. In recent years, there has been a demand from the market for storage systems that are low-cost but still can achieve high performance in particular.

It is common in most storage systems that a host interface (hereinafter, "host I/F") performs a data transfer process between a host computer and a cache memory while a disk interface (hereinafter, "disk I/F") performs a data transfer process between a cache memory and a storage device. Note that, the host I/F and the disk I/F may be collectively referred to below as "protocol chip."

The operation of storage systems, however, has various problems that are hard to solve using general-purpose protocol chips.

For example, when data is to be transferred from a storage device to a cache memory including an area where dirty data being update data yet to be written to a disk exists, the data needs to be transferred to the cache memory while avoiding the above area in order to avoid overwriting the dirty data with the transferred data. This case has a problem that a disk-read process needs to be performed a plurality of times. With respect to this problem, PTL 1 discloses a method for minimizing the number of disk-read processes. This method, called "bitmap staging", uses the function of the data transfer controller called DMA (Direct Memory Access) to transfer only the necessary part of the data to the cache memory while selectively making a mask for the area where the dirty data is stored.

In addition, PTL 2 discloses a method for detecting a failure in storing data in its entirety in the storage apparatus, for example. This method uses DMA to append to the transfer data a special error detection code, called WRSEQ#, which is hard to provide with use of general-purpose protocol chips, and to check the appended special error detection code.

Besides the aforementioned examples, there are many storage systems that include an LSI (Large Scale Integration) with the DMA in addition to protocol chips, and that use the functions of DMA, such as dual-writing process to a cache memory, in order to achieve functions which are hard to provide with use of general-purpose protocol chips.

CITATION LIST

Patent Literature

PTL 1: Japanese Patent Application Laid-open Publication No. 6-28261
PTL 2: Japanese Patent Application Laid-open Publication No. 2009-64363

SUMMARY OF INVENTION

Technical Problem

The delay of a process (hereinafter, "latency") in a processor executing a DMA-involved process is usually greater than the latency involved in the transfer using only the protocol chips. In order to hide the latency, data needs to be redundantly and simultaneously transferred. For such a multiplex data transfer, a buffer with a suitable capacity needs to be introduced, however. Further, special functions of DMA such as the bitmap staging and appending/checking of the special error detection code are based in many cases on the premise that the buffer area exists in an area other than the cache memory area. Meanwhile, middle-range-class or entry-class storage systems are desired to be cost effective. Thus, storage systems in these classes are highly required to achieve higher I/O performance with limited hardware resources.

The present invention is made in view of the problems above. Thus, an object of the present invention is to provide a storage system and a data transfer method of a storage system that can achieve higher I/O performance even when hardware resources are limited as in the case of middle-range-class and entry-class storage systems.

Solution to Problem

In order to achieve the aforementioned object or other objects, one aspect of the present invention provides a storage system including: a storage apparatus that stores therein data used by an external apparatus; first and second temporary data storage units that temporarily store therein data to be written to the storage apparatus from the external apparatus or data read from the storage apparatus; a first data transfer controller communicatively coupled with the external apparatus, the first and second temporary data storage units and the storage apparatus, and controls data transfer between the external apparatus, the first and second temporary data storage units and the storage apparatus; a second data transfer controller communicatively coupled with the first and second temporary data storage units, that controls data transfer between the first and second temporary storage units, and performs a data processing function not included in the first data transfer controller; and a data transfer control management unit that causes any one of a first data transfer process and a second data transfer process to be performed upon receipt of a data I/O request from the external apparatus, the first data transfer process executing data transfer between the external apparatus and the storage apparatus via the first temporary data storage unit under control of the first data transfer controller, and the second data transfer process executing data transfer between the external apparatus or the storage apparatus and the first temporary data storage unit under control of the first data transfer controller and executing data transfer between the first temporary data storage unit and the second temporary data storage unit under control of the second data transfer controller.

Advantageous Effects of Invention

According to the present invention, it is possible to provide a storage system and a data transfer method of a storage system that can achieve higher data I/O performance even when hardware resources are limited as in the case of the middle-range and entry-class storage systems.

The solution, configuration and the effect of the present invention other than those described above are illustrated by the description of embodiments below.

DESCRIPTION OF EMBODIMENTS

Hereinafter, first and second embodiments are described with reference to the drawings as embodiments of the present invention.

First Embodiment

Figure 1:
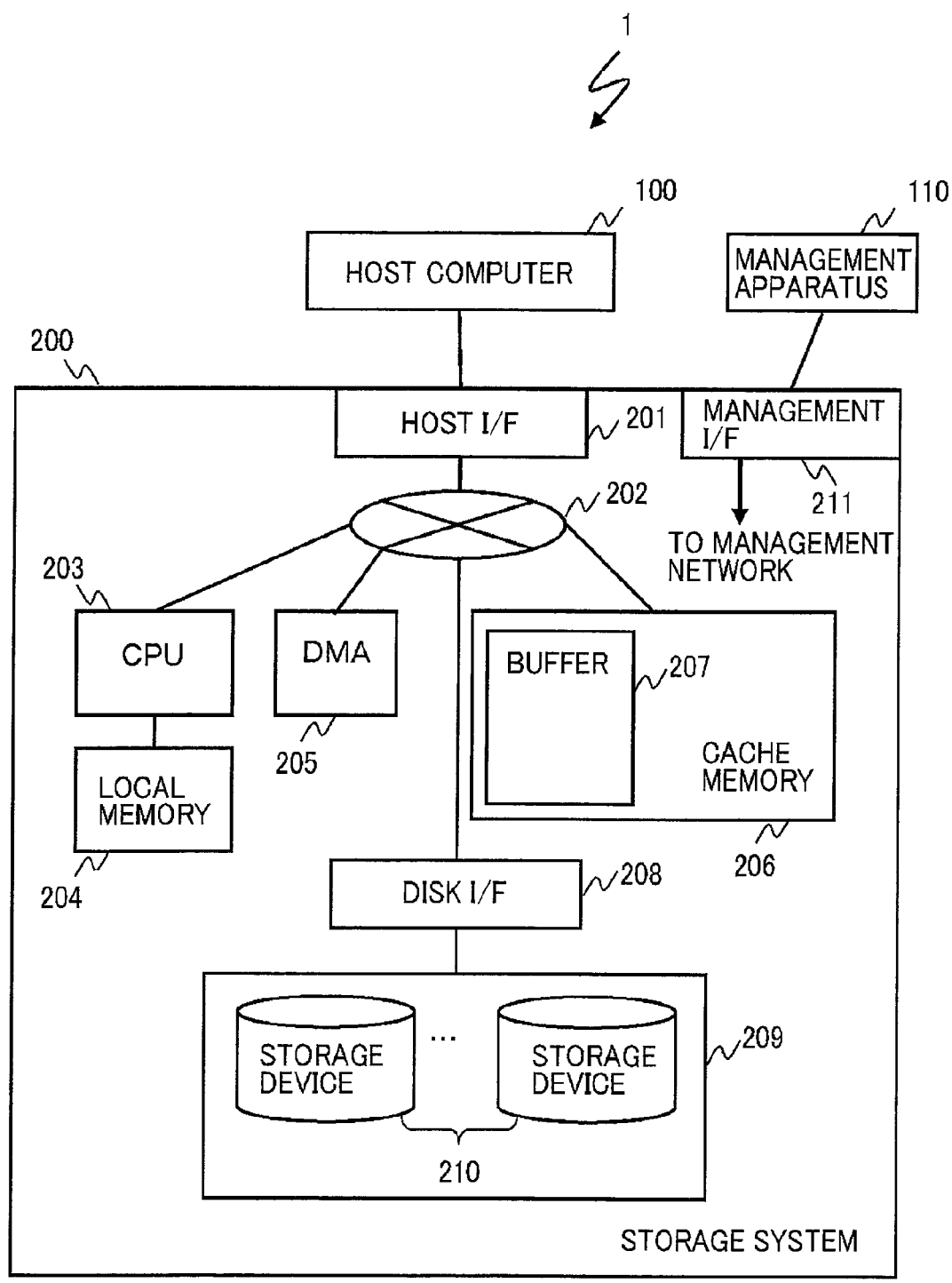
FIG. 1 illustrates an exemplary configuration of an information processing system 1 including a storage system 200 to which the present invention is applied.

Firstly, the first embodiment of the present invention is described with reference to FIGS. 1 to 28. FIG. 1 illustrates an exemplary configuration of an information processing system 1 of the first embodiment.

The first embodiment relates to a data I/O process of the present invention that is performed in a single storage system. The configuration illustrated in FIG. 1 shows an outline of the present invention to such an extent that the present invention can be understood and realized. Accordingly, the configuration of the present invention is not limited in FIG. 1.

The information apparatus 1 of the first embodiment illustrated in FIG. 1 includes a host computer 100 (external apparatus), a storage system 200 that is communicatively coupled with the host computer 100, and a management apparatus 110 that is communicatively coupled with the storage system 200.

The host computer 100 is coupled with a host I/F 201 included in the storage system 200. The host computer 100 uses the storage system 200 as a data storage area for software such as applications running on the host computer 100. Although a single host computer 100 is coupled with a storage system 200 in the example in FIG. 1, a plurality of host computers 100 may be coupled therewith.

Figure 2:
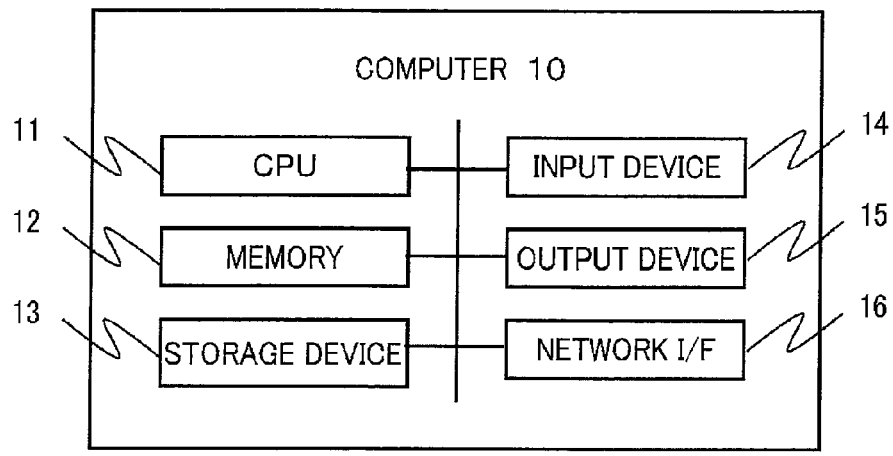
FIG. 2 illustrates an exemplary configuration of a computer 10 that can be used as a host computer 100 and a management apparatus 110.

FIG. 2 illustrates an exemplary computer 10 that can be used as the host computer 100. The computer 10 includes a CPU (Central Processing Unit) 11, a volatile or non-volatile memory 12 (RAM (Random Access Memory) or ROM (Read-Only Memory)), a storage device 13 (for example, HDD (Hard Disk Drive) or SSD (Solid State Drive)), an input device 14 such as a keyboard and a mouse, an output device 15 such as a liquid crystal monitor and a printer, and a network interface such as NIC and HBA (referred to as "network I/F 16").

Figure 3:
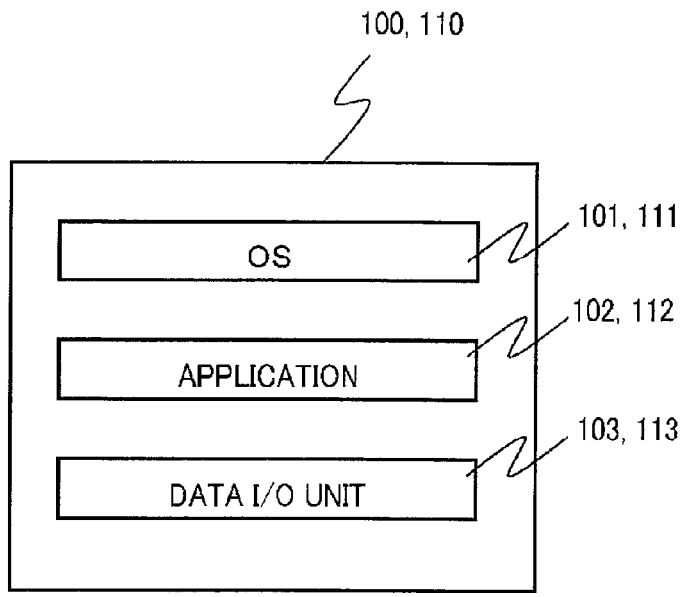
FIG. 3 illustrates an exemplary software configuration of the host computer 100 and the management apparatus 110.

FIG. 3 illustrates an exemplary software configuration of the host computer 100. The host computer 100 includes an operating system (Operating System, hereinafter "OS") 101 that is fundamental software controlling hardware resources of the host computer 100, various applications 102 that are application software to be run on the OS 101, and a data I/O unit 103 that performs a data I/O process with the external apparatuses. The data writing process from an application 102 to the storage system 200 and the data reading process from the storage system 200 are performed in a manner such that a host I/O request issued via the data I/O unit 103 is sent to the host I/F 201 of the storage system 200 described later.

The management apparatus 110 receives an instruction from the manager of the storage system 200 via input devices such as a keyboard and a mouse and has a function of sending the received operation or maintenance instruction to each apparatus via the management I/F 211 provided in the storage system 200. The management apparatus 110 is, for example, a personal computer or an office computer and has a configuration of a computer 10 illustrated in FIG. 2.

The management apparatus 110 may be integrally configured with the storage system 200 (may be installed in the same chassis). As with the aforementioned host computer 100, the management apparatus 110 has the software configuration illustrated in FIG. 3, for example. In addition, the management apparatus 110 includes an application 112 having a GUI (Graphical User Interface), CLI (Command Line Interface) or the like to control or monitor the storage system 200, an OS 111 and a data I/O unit 113.

The communications via an internal network 202 are realized according to a protocol such as Fibre Channel, iSCSI and TCP/IP.

Next, the storage system 200 of the present embodiment is described below. As illustrated in FIG. 1, the storage system 200 is configured to include a host I/F 201 (first data transfer controller), an internal network 202, a CPU 203, a local memory 204, a DMA 205 (third data transfer controller), a cache memory 206 (first temporary data storage), a disk I/F 208 (second data transfer controller), a storage apparatus 209, and a management I/F 211. Each of the following components may be provided in multiple units in the storage system 200: the host I/F 201, the internal network 202, the CPU 203, the local memory 204, the DMA 205, the cache memory 206, the disk I/F 208, the storage apparatus 209 and the management I/F 211.

The cache memory 206 is a memory that temporarily stores data communicated between the host computer 100 and the storage device 210 and is configured using a RAM that can be accessed at high speed, for example. Further, in the embodiment, the cache memory 206 internally includes a buffer 207 (second temporary data storage device). The buffer 207 is used as the storage area that temporarily stores transfer data when the host I/F 201 controls data transfer between the host computer 100 and the cache memory 207 or when the disk I/F 208 controls data transfer between the storage apparatus 209 and the cache memory 206 as described later. Here, the buffer 207 may be provided in a hardware memory other than the cache memory 206. The cache memory 206 can be accessed via the internal network 202 by the host I/F 201, the CPU 203, the DMA 205 and the disk I/F 208.

The storage apparatus 209 is coupled with the internal network 202 via the disk I/F 208 and is configured to include multiple storage devices 210 (HDD, SSD, flexible disk, magnetic tape, optical disk, and the like). In the description below, the storage apparatus 209 includes such as a SAS (Serial Attached SCSI), SATA (Serial ATA), FC (Fiber Channel), PATA (Parallel ATA), or SCSI type HDD or SSD.

The storage apparatus 209 provides a storage area in units of logical devices (LDEVs), which is configured by a storage area (for example, storage area of a RAID (Redundant Arrays of Inexpensive (or Independent) Disks) group (Parity Group)) provided by controlling storage devices 210 on a control method such as a RAID. Thus, the storage system 200 provides the host computer 100 with a logical storage area (LU: Logical Unit) configured using an LDEV.

Figure 4:
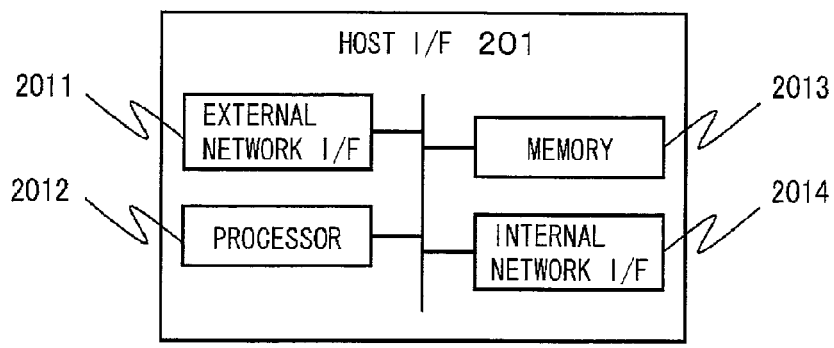
FIG. 4 illustrates an exemplary hardware configuration of a host I/F 201.

The host I/F 201 has a function of executing data transfer between the host computer 100 and the cache memory 206 or the buffer 207. The host I/F 201 is coupled with the cache memory 206 or the buffer 207 via the internal network 202. FIG. 4 illustrates an exemplary hardware configuration of the host I/F 201. The host I/F 201 includes: an external network interface (hereinafter, "external network I/F 2011") having a port (network port) to communicate with the host computer 100; a processor 2012; a memory 2013; and an internal network interface (hereinafter, "internal network I/F 2014") having a port (network port) to communicate with the internal network 202.

The external network I/F 2011 is configured using a NIC (Network Interface Card) or HBA (Host Bus Adaptor), for example. The processor 2012 is configured using a CPU or MPU (Micro Processing Unit), for example. The memory 2013 is a RAM, ROM, or the like. The internal network I/F 2014 performs communications via the internal network 202 with the CPU 203, the local memory 204, the disk I/F 208, the cache memory 205, and the buffer 207.

Figure 5:
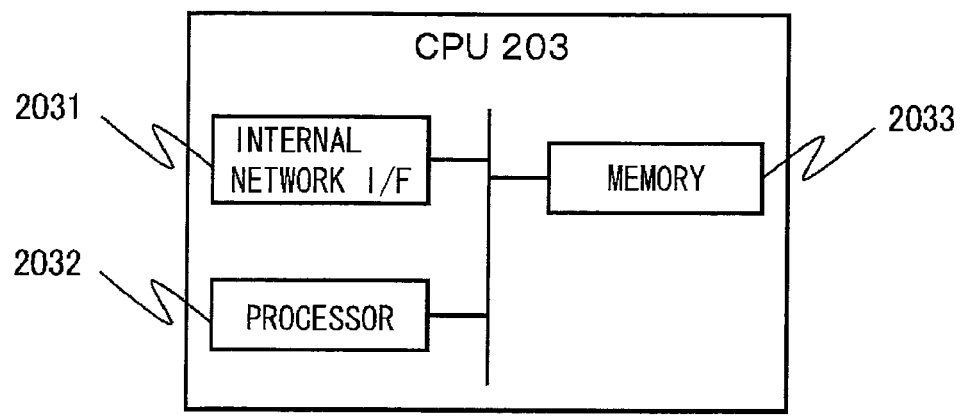
FIG. 5 illustrates an exemplary hardware configuration of a CPU 203.

The CPU 203 controls sending or reception of data between the host computer 100 and the storage apparatus 209 by controlling various computer programs stored in the local memory 204. FIG. 5 illustrates an exemplary hardware configuration of a CPU 203. The CPU 203 includes an internal network interface (hereinafter, "internal network I/F 2031"), a processor 2032 and a memory 2033. The internal network I/F 2031 performs communications with the host I/F 201, the disk I/F 208, the local memory 204, and the cache memory 206 via the internal network 202. The internal network I/F 2031 performs communications with the management apparatus 110 through the management I/F 211 via a management network that is set up in addition to the internal network 202. The processor 2032 is an appropriate arithmetic processor. The memory 2033 is a RAM or ROM and is used as a buffer or the like for the data I/O of the CPU 203.

Figure 7:
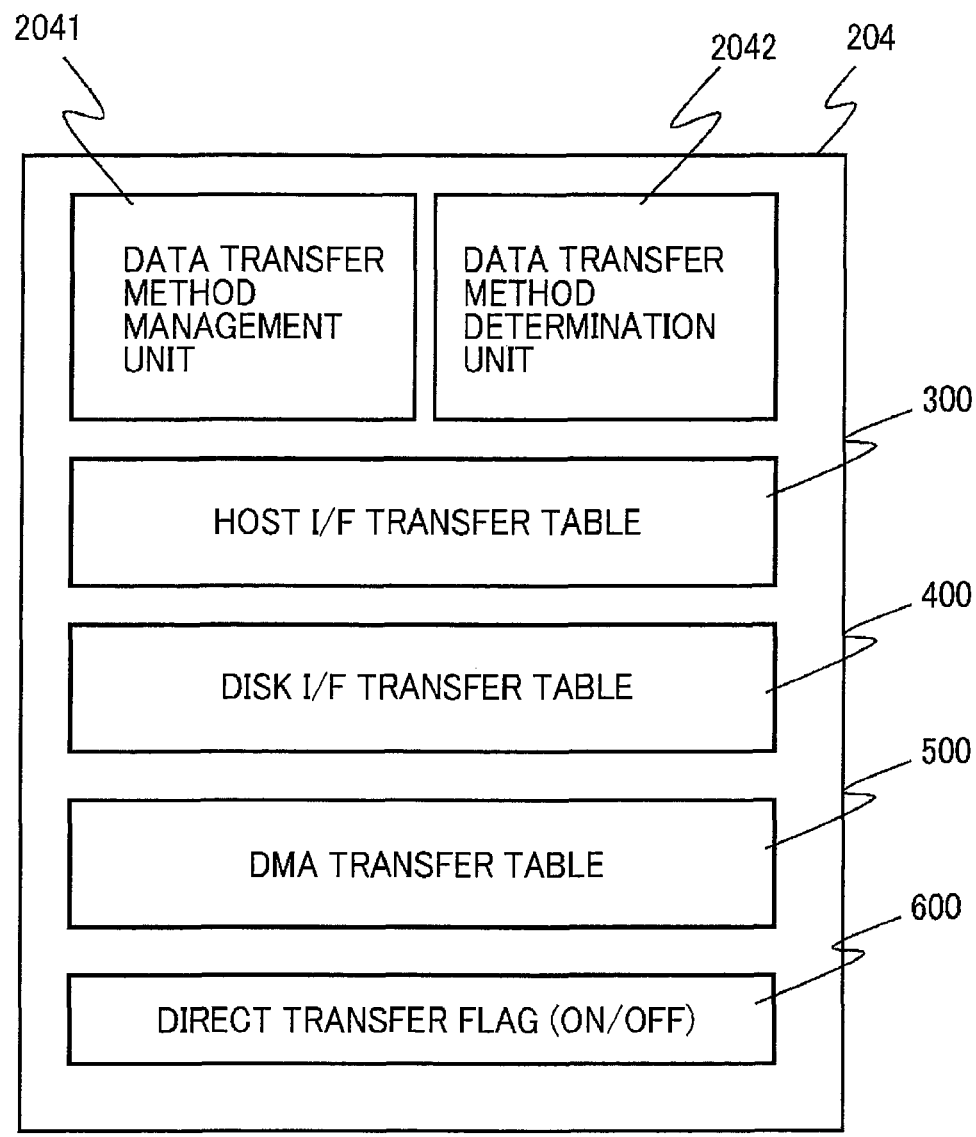
FIG. 7 illustrates exemplary information that is stored in a local memory 204.

The local memory 204 is coupled with the CPU 203 and has a function of storing instructions or the like given by the CPU 203. The local memory 204 includes an interface circuit for coupling the memory such as a RAM and ROM with the CPU 203. FIG. 7 illustrates an exemplary configuration of computer programs, data to be stored and the like in the local memory 204.

In the example illustrated in FIG. 7, the local memory 204 stores therein computer programs with functions of a data transfer method management unit 2041 and a data transfer method determination unit 2042 that are read and performed by the CPU 203. Further, the local memory 204 stores therein data tables and the like such as a host I/F transfer table 300, a disk I/F transfer table 400, a DMA transfer table 500 and a direct transfer flag 600.

The data transfer method management unit 2041 (data transfer control management unit) provides a data transfer control function of the CPU 203 between the host computer 100, the cache memory 206, the buffer 207, and the storage apparatus 209. The data transfer method determination unit 2042, which configures the data transfer control management unit with the data transfer method management unit 2041, provides a function of determining whether the data transfer with the DMA 205 is to be performed or not.

The host I/F transfer table 300, the disk I/F transfer table 400, and the DMA transfer table 500 are created on the local memory 204 according to the contents of a host I/O request every time the CPU 203 receives the host I/O request from the host computer 100. These tables 300, 400, and 500 are described later.

The direct transfer flag 600 is set at ON or OFF by the CPU 203 on the basis of various transfer conditions included in the host I/O request or the like. According to the data recorded in the direct transfer flag 600, the CPU 203 determines whether the data transfer process with the DMA 205 is to be performed or not. If the direct transfer flag 600 is set at ON, the data transfer process with the DMA 205 is not performed. Although the direct transfer flag 600 is stored in the local memory 204 in FIG. 7, the direct transfer flag 600 may be stored in a part of the cache memory 206 or the buffer 207 as long as the CPU 203 can refer to these memories.

The computer programs and data tables stored in the local memory 204 are not necessarily prepared in units of blocks illustrated in FIG. 7 and, instead, may be prepared in other ways as long as they realize the functions of the embodiments of the present invention described below in detail.

The DMA 205 has a function of executing data transfer between the cache memory 206 and the buffer 207 and has various special functions that cannot be realized with a general-purpose protocol chip. These special functions of the DMA 205 are described later. The DMA 205 is coupled with the cache memory 206 and the buffer 207 via the internal network 202. An exemplary hardware configuration of the DMA 205 is a custom LSI configured to have predetermined data transfer functions including the special functions. The DMA 205 can be implemented by other hardware configurations such as a processor.

Figure 6:
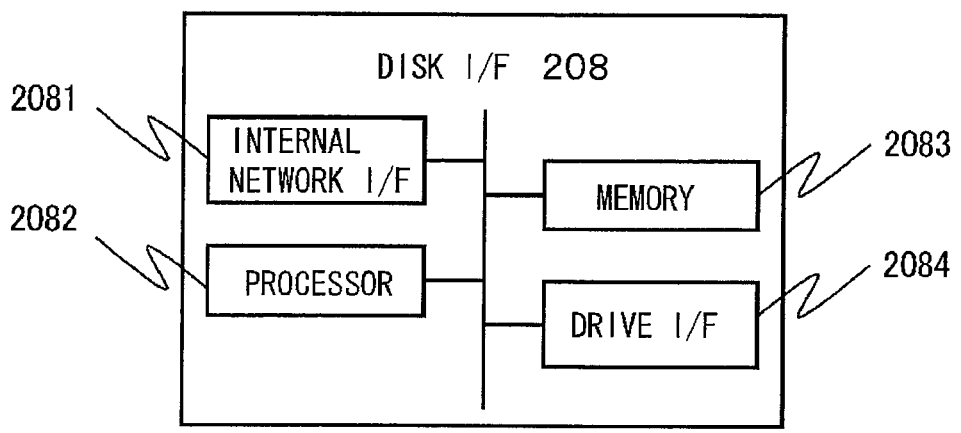
FIG. 6 illustrates an exemplary hardware configuration of a disk I/F 208.

The disk I/F 208 has a function of executing data transfer between the storage apparatus 209 and the cache memory 206 or the buffer area 207. The disk I/F 208 is coupled with the cache memory 206 or the buffer 207 via the internal network 202. FIG. 6 illustrates an exemplary hardware configuration of the disk I/F 208. The disk I/F 208 includes an internal network I/F 2081, a processor 2082, a memory 2083, and a drive interface (hereinafter, the drive I/F 2084). The internal network I/F 2081 communicates via the internal network 202 with the host I/F 201, the CPU 203, the local memory 204, the cache memory 206, and the buffer 207. The processor 2082 is, for example, a CPU or MPU. The memory 2083 is, for example, a RAM or ROM. The drive I/F 2084 communicates with the storage apparatus 209. The hardware configurations illustrated in FIGS. 1, 2 and 4 to 6 are merely an example of the embodiment. How the hardware components are included in the storage system 200 can be determined flexibly based on the demand from the viewpoint of performance or design.

In the embodiment, as explained with FIG. 7, the CPU 203 receiving a host I/O request from the host computer 100 creates the host I/F transfer table 300, the disk I/F transfer table 400 and the DMA transfer table 500 and stores these tables in the local memory 204. Then, the host I/F 201, the disk I/F 208 and the DMA 205 perform data transfer according to the information recorded in the transfer tables 300, 400, and 500. The host I/F transfer table 300, the disk I/F transfer table 400 and the DMA transfer table 500 are described below in detail.

Figure 8:
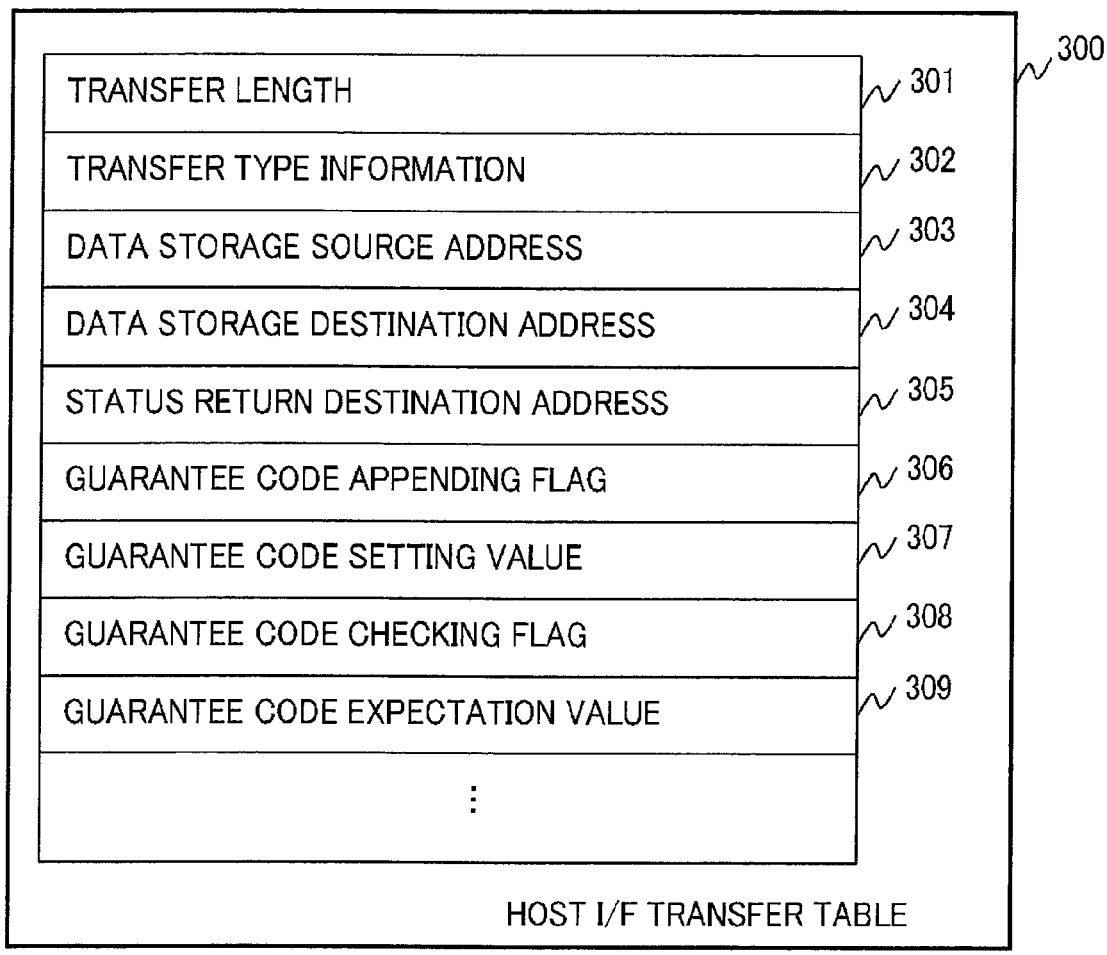
FIG. 8 illustrates an exemplary host I/F transfer table 300 that stores therein transfer information used for data transfer by the host I/F 201.

To begin with, the host I/F transfer table 300 is described below. FIG. 8 illustrates an exemplary configuration of the host I/F transfer table 300 storing therein the control information that the host I/F 201 refers to and uses when I/F 201 transfers data as described later. The host I/F transfer table 300 is created by the CPU 203 on the basis of the host I/O request received from the host computer 100. Then, the host I/F 201 performs data transfer on the basis of the information stored in the host I/F transfer table 300. Although the host I/F transfer table 300 is stored in the local memory 204 in FIG. 7, the host I/F transfer table 300 may be stored in a part of the cache memory 206 or the buffer 207 as long as the CPU 203 can refer to these memories.

The pieces of information stored in the host I/F transfer table 300 are described in turn below. A transfer length 301 stores therein a length of data to be transferred by the host I/F 201.

Transfer type information 302 stores therein information as to whether the data transfer process using the host I/F transfer table 300 is a writing process to the buffer 207 or the cache memory 206 from the host computer 100 or a reading process from the buffer 207 or the cache memory 206 to the host computer 100. Further, the transfer type information 302 stores therein a determination flag or the like as to whether the special I/O process using a function available to the host I/F 201 is performed.

A data storage source address 303 stores therein address information of the cache memory 206 or the buffer 207 storing data that is accessed by the I/O process if the host I/O request from the host computer 100 is a reading process.

A data storage destination address 304 stores therein address information of the cache memory 206 or the buffer 207 storing the data that is accessed by the I/O process if the host I/O request from the host computer 100 is a writing process.

A status return destination address 305 stores therein address information of the local memory 204 to which the host I/F 201 sends back, after the data transfer process is finished, the status information indicating the completion of the transfer in order to notify the CPU 203 of the completion of the data transfer.

A error detection code appending flag 306 (information indicating a determination result as to whether or not to append a error detection code) stores therein information as to whether the error detection code that can be appended by the host I/F 201 needs to be appended or not. The information as to whether the error detection code needs to be appended or not may be determined by the CPU 203 on the basis of the contents of the host I/O request and may be stored, for example, in a format of an ON or OFF flag. The error detection code is a code that is appended, when data is written from the host computer 100 to the storage apparatus 209, to the original data in order to check the consistency in reading the same data. For example, a possible method is that the 8-byte error detection code is appended to the data that is read or written in 512-byte units.

A error detection code setting value 307 stores therein a setting value of the error detection code appended by the host I/F 201 if the error detection code appending flag 306 is set at ON.

A error detection code checking flag 308 (information indicating whether or not to check a error detection code) stores therein information as to whether the error detection code that can be checked by the host I/F 201 needs to be checked or not if the host I/O request from the host computer 100 is a reading process. The information as to whether the error detection code check is needed or not is determined by the CPU 203 on the basis of the contents of the host I/O request and is stored, for example, in a format of an ON or OFF flag. A error detection code expectation value 309 stores therein the expectation value of the error detection code that is used for the checking by the host I/F 201 if the error detection code checking flag 308 is set at ON. The information stored in the host I/F transfer table 300 is not limited to information illustrated in FIG. 8.

Figure 9:
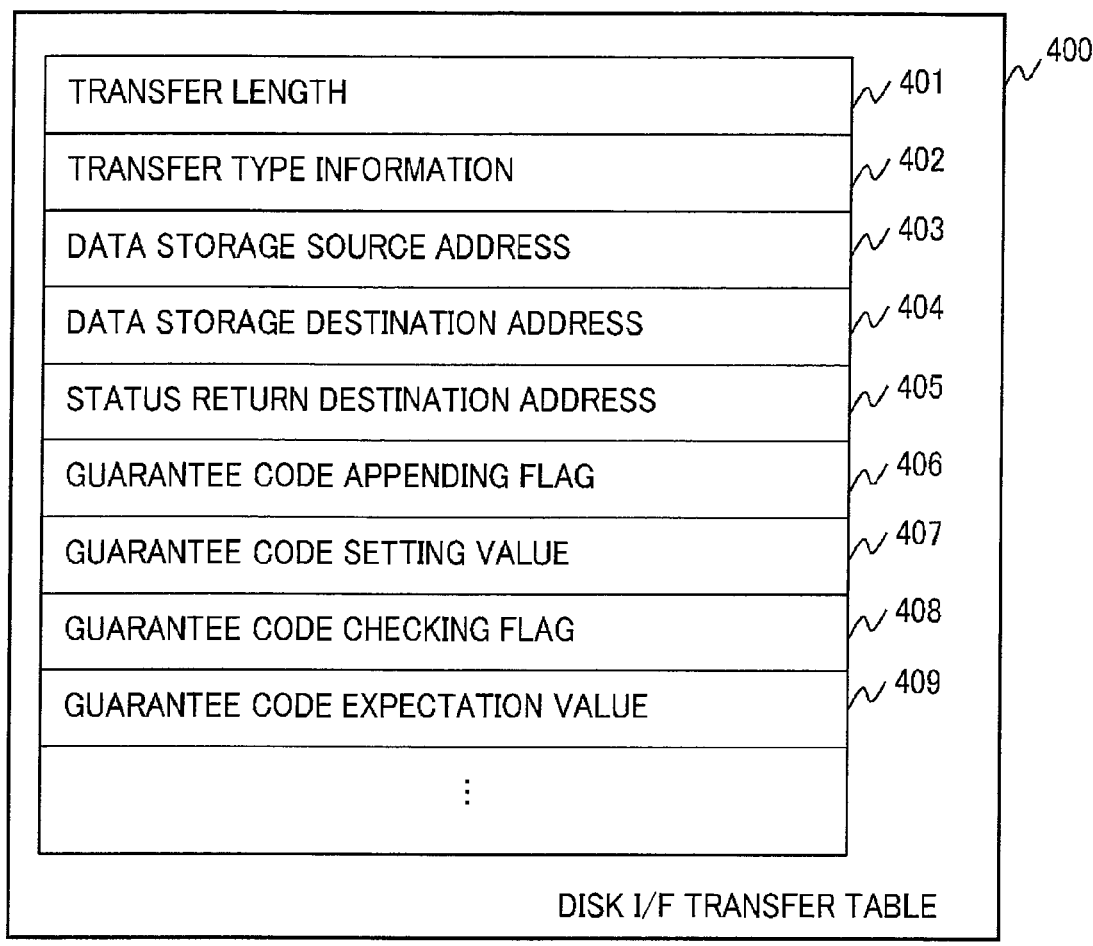
FIG. 9 illustrates an exemplary disk I/F transfer table 400 that stores therein transfer information used for data transfer by the disk I/F 208.

Next, the disk I/F transfer table 400 is described below. FIG. 9 illustrates an exemplary configuration of the disk I/F transfer table 400 storing therein the control information that the disk I/F 208 refers to and uses when the disk I/F 208 transfers data as described below. The disk I/F transfer table 400 is created by the CPU 203 on the basis of the host I/O request received from the host computer 100. The disk I/F 208 performs data transfer on the basis of the information recorded in the disk I/F transfer table 400. Although the disk I/F transfer table 400 is stored in the local memory 204 in FIG. 7, the disk I/F transfer table 400 may be stored in a part of the cache memory 206 or the buffer 207 as long as the CPU 203 can refer to these memories.

The pieces of information stored in the disk I/F transfer table 400 are described in turn below. Firstly, a transfer length 401 stores therein a length of data to be transferred by the disk I/F 208.

Transfer type information 402 stores therein information as to whether a data transfer process performed by the disk I/F 208 using the disk I/F transfer table 400 is a writing process from the buffer 207 or the cache memory 206 to the storage apparatus 209 or is a reading process from the storage apparatus 209 to the buffer 207 or the cache memory 206. Further, the transfer type information stores therein a determination flag or the like as to whether the special I/O process using a function available to the disk I/F 208 is performed.

A data storage source address 403 stores therein address information of the cache memory 206 or the buffer 207 storing data that is accessed by the I/O process if the host I/O request from the host computer 100 is a writing process, and stores therein address information of the storage apparatus 209 storing data that is accessed by the I/O process if the host I/O request from the host computer 100 is a reading process.

A data storage destination address 404 stores therein address information of the storage apparatus 209 storing data that is accessed by the I/O process if the host I/O request from the host computer 100 is a writing process, and stores therein address information of the cache memory 206 or the buffer 207 storing data that is accessed by the I/O process if the host I/O request from the host computer 100 is a reading process.

A status return destination address 405 stores therein address information of the local memory 204 to which the disk I/F 208 sends back, after the data transfer process is finished, the status information indicating the completion of the transfer in order to notify the CPU 203 of the completion of the data transfer.

A error detection code appending flag 406 (information indicating a determination result as to whether or not to append a error detection code) stores therein information as to whether the error detection code that can be appended by the host I/F 201 needs to be appended or not. The information as to whether the error detection code needs to be appended or not is dealt in the same way as that described for the host I/F transfer table 300. A error detection code setting value 407 stores therein a setting value of the error detection code appended by the disk I/F 208 if the error detection code appending flag 406 is set at ON.

A error detection code checking flag 408 (information indicating whether or not to check a error detection code) stores therein information as to whether the error detection code that can be checked by the disk I/F 208 needs to be checked or not, as in the case of the host I/F transfer table 300. The error detection code expectation value 409 stores therein an expectation value of the error detection code that is used for the checking by the disk I/F 208 if the error detection code checking flag 408 is set at ON. The information stored in the disk I/F transfer table 400 is not limited to the information illustrated in FIG. 9.

Figure 10:
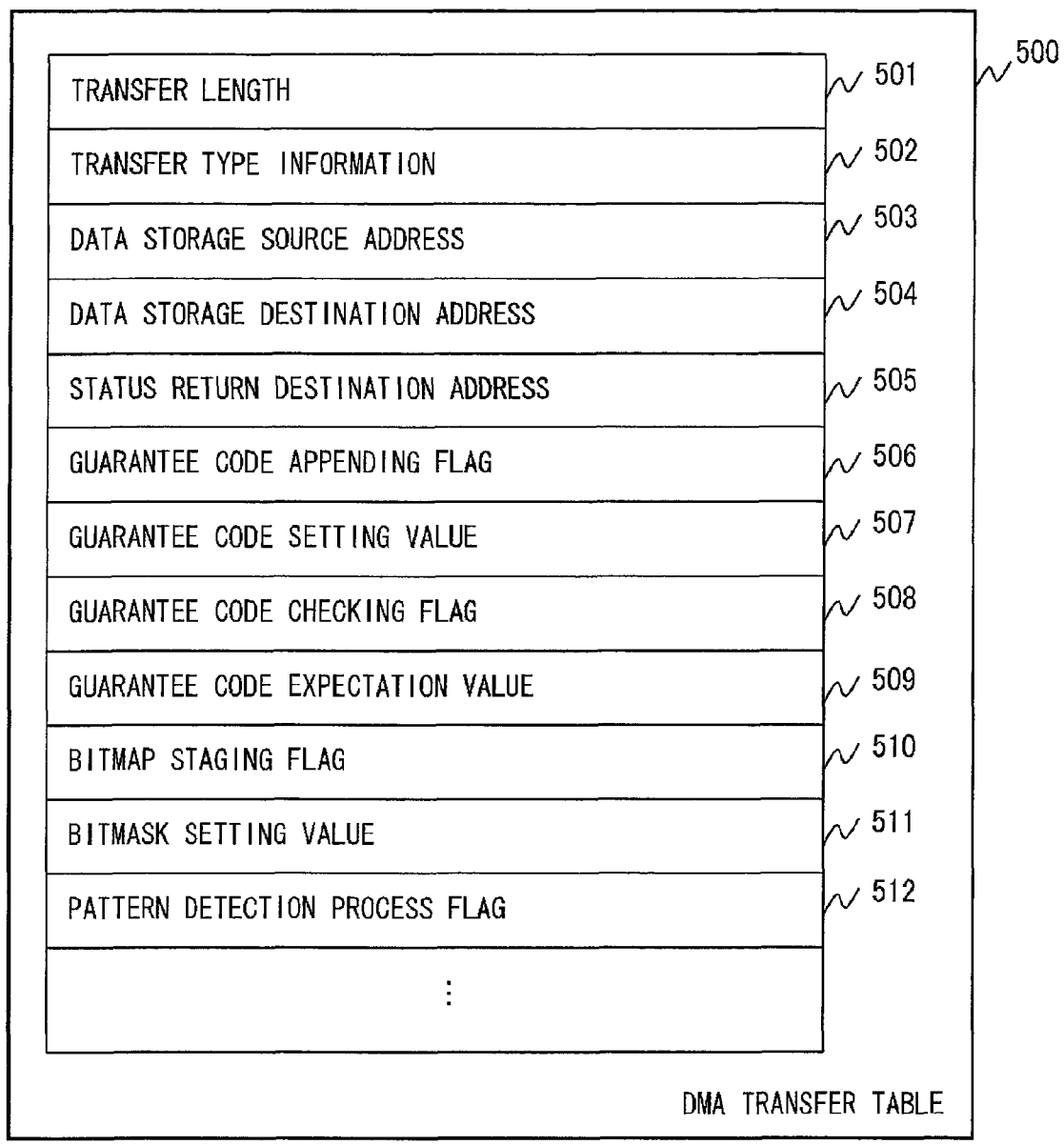
FIG. 10 illustrates an exemplary DMA transfer table 500 that stores therein transfer information used for data transfer by the DMA 205.

Next, the DMA transfer table 500 is described below. FIG. 10 illustrates an exemplary configuration of the DMA transfer table 500 storing therein the control information that the DMA 205 refers to and uses when the DMA 205 transfers data as described below. The DMA transfer table 500 is created by the CPU 203 on the basis of the host I/O request received from the host computer 100. The DMA 205 performs the data transfer with reference to the information stored in the DMA transfer table 500. Although the DMA transfer table 500 is stored in the local memory 204 in FIG. 7, the DMA transfer table 500 may be stored in such as a part of the cache memory 206 and the buffer 207 as long as the CPU 203 can refer to these memories.

The pieces of information stored in the DMA transfer table 500 are described in turn below. Firstly, a transfer length 501 stores therein a length of data to be transferred.

Transfer type information 502 stores therein information as to whether a data transfer process performed by the DMA 205 based on DMA transfer table 500 is a data transfer process from the buffer 207 to the cache memory 206 or is a data transfer process from the cache memory 206 to the buffer 207. Further the transfer type information 502 stores therein a determination flag or the like as to whether the special I/O process using a function available to the DMA 205 is performed.

A data storage source address 503 stores therein address information of the cache memory 206 or the buffer 207 storing data that is accessed by the I/O process.

A data storage destination address 504 stores therein address information of the cache memory 206 or the buffer 207 storing data that is accessed by the I/O process.

A status return destination address 505 stores therein address information of the local memory 204 to which the DMA 205 sends back, after the data transfer process is finished, the status information indicating the completion of the transfer in order to notify the CPU 203 of the completion of the data transfer.

A error detection code appending flag 506 (information indicating a determination result as to whether or not to append a error detection code) stores therein information as to whether the error detection code that can be appended to the I/O process data by the DMA 205 needs to be appended or not. The information as to whether the error detection code needs to be appended or not is determined, as in the case of the host I/F transfer table 300, by the CPU 203 on the basis of the contents of the host I/O request and is stored, for example, in a format of an ON or OFF sign.

A error detection code setting value 507 stores therein a setting value of the error detection code that is appended by the DMA 205 in a case where the error detection code appending flag 506 is set at ON.

A error detection code checking flag 508 (information indicating whether or not to check a error detection code) stores therein information as to whether the error detection code that can be checked by the DMA 205 needs to be checked or not. A error detection code expectation value 509 stores therein an expectation value of the error detection code to be checked by the DMA 205 if the error detection code checking flag 508 is set at ON.

A bitmap staging flag 510 (information indicating whether or not to perform a bitmap staging process) stores therein information as to whether the bitmap staging process is to be performed or not. A bitmask setting value 511 stores therein bitmask information that is used for masking the staging data if the bitmap staging flag 510 is set at ON. A pattern detection process flag 512 (information indicating whether or not to perform a pattern detection process) stores therein information as to whether a pattern detection process is to be performed or not. The bitmask staging process and the pattern detection process are described later. The information stored in the DMA transfer table 500 is not limited to those illustrated in FIG. 10.

Figure 11:
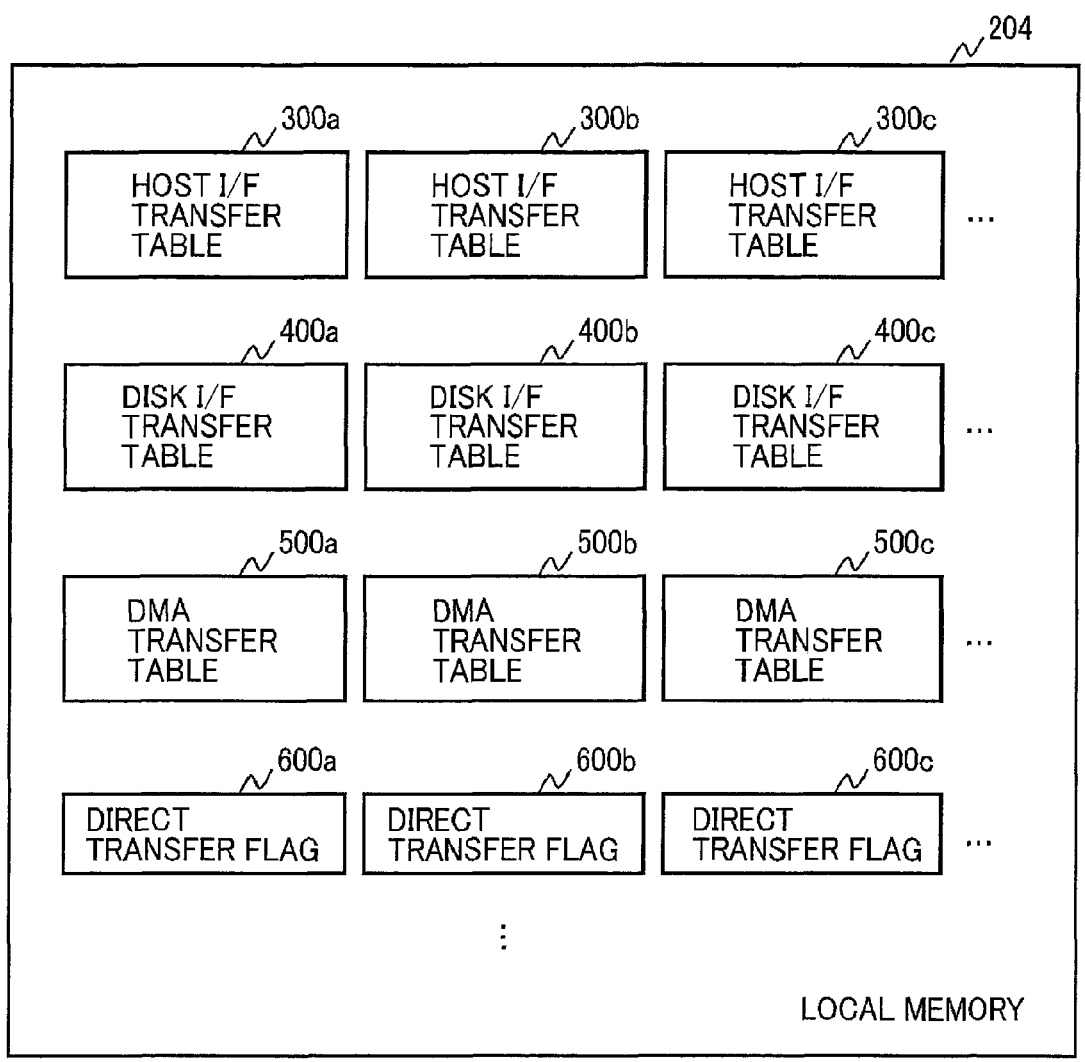
FIG. 11 illustrates an exemplary status where the host I/F transfer table 300, the disk I/F transfer table 400, the DMA transfer table 500, and a direct transfer flag 600 are stored in the local memory 204 as transfer information.

FIG. 11 illustrates an exemplary status where the host I/F transfer table 300, the disk I/F transfer table 400 and the DMA transfer table 500 are stored in the local memory 204 as the transfer information. As described above, the CPU 203 creates the host I/F transfer table 300, the disk I/F transfer table 400, or the DMA transfer table 500 every time receiving a host I/O request from the host computer 100. Therefore, the local memory 204 is configured to be capable of storing therein a plurality of transfer tables, for example, host I/F transfer tables 300*a*, 300*b* and 300*c*. In FIG. 11, the local memory 204 stores therein the host I/F transfer tables 300*a*, 300*b* and 300*c*, disk I/F transfer tables 400*a*, 400*b* and 400*c*, DMA transfer tables 500*a*, 500*b* and 500*c*, and direct transfer flags 600*a*, 600*b* and 600*c*.

Figure 12:
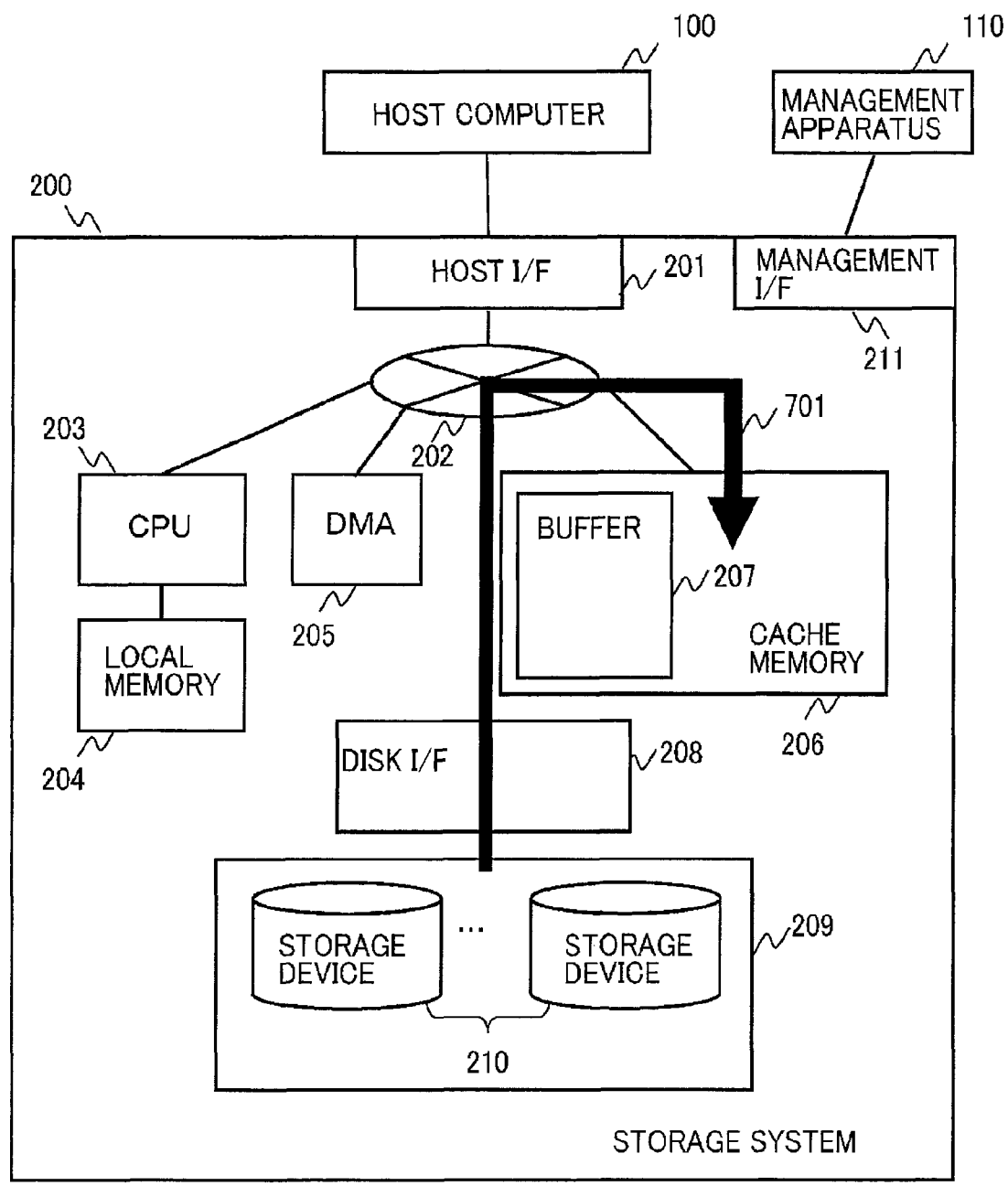
FIG. 12 illustrates an exemplary configuration of a direct transfer in the storage system 200.

Next, the data transfer method of the present embodiment, which is performed for data transfer among the host computer 100, the cache memory 206 or the buffer 207 and the storage apparatus 209, is described below with reference to example processes in the figures. FIG. 12 illustrates an exemplary schematic diagram of a data transfer method (hereinafter, "direct transfer (direct data transfer)") with which data is directly transferred from the storage apparatus 209 to the cache memory 206. The direct transfer shown in FIG. 12 is performed by the disk I/F 208. Although FIG. 12 illustrates data transfer (hereinafter, "staging") 701 from the storage apparatus 209 to the cache memory 206 as an example, a data transfer process with the direct transfer can be performed in either of the cases of data transfer (hereinafter, "destage") from the cache memory 206 to the storage apparatus 209, and data transfer between the host computer 100 and the cache memory 206.

Figure 13:
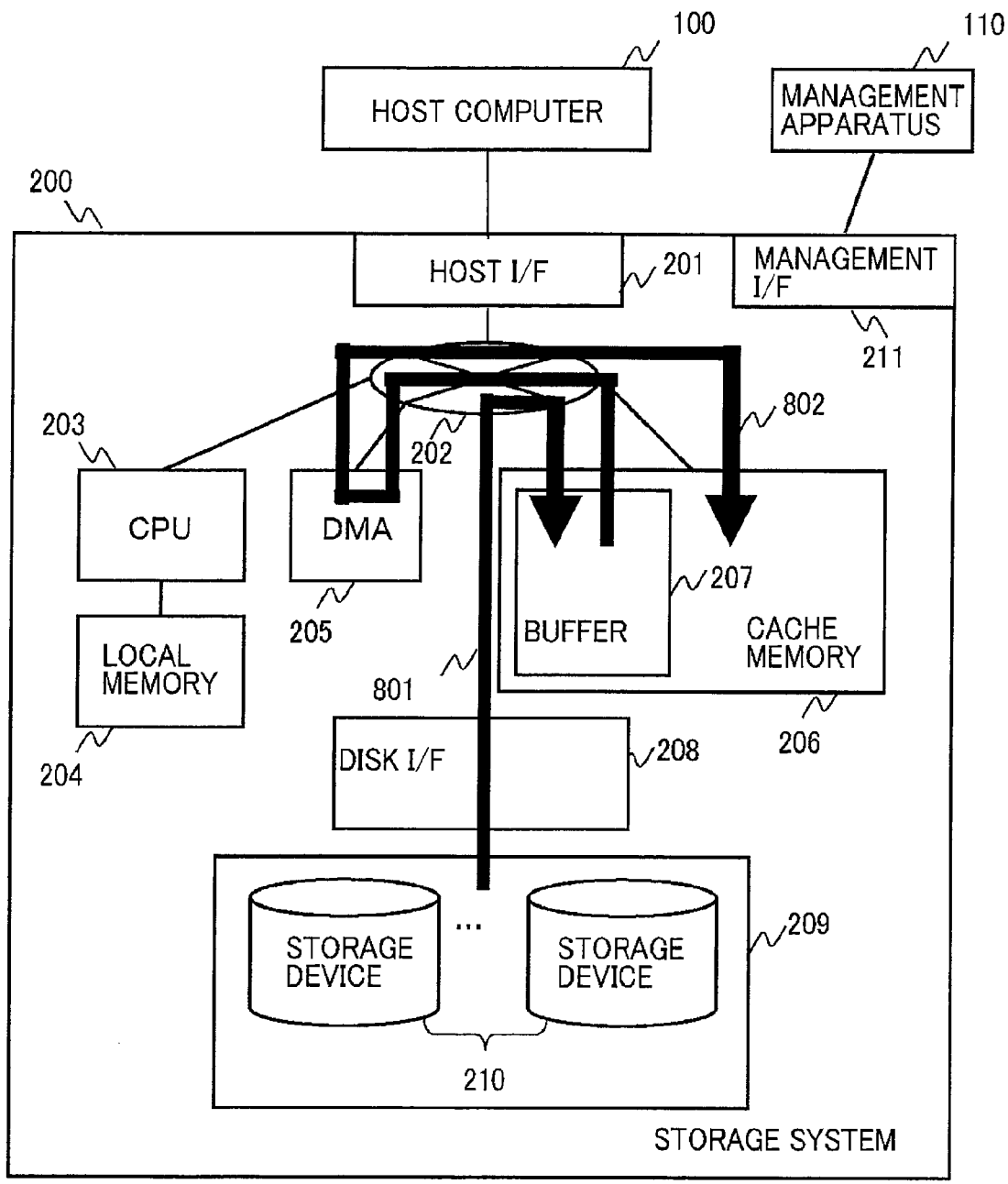
FIG. 13 illustrates an exemplary configuration of two-step transfer in the storage system 200.

Meanwhile, FIG. 13 illustrates an exemplary schematic diagram of a data transfer method (hereinafter, "two-step transfer") with which data read from the storage apparatus 209 is first stored in the buffer 207 inside the cache memory 206 and then transferred by the DMA 205 to the cache memory 206. The two-step transfer illustrated in FIG. 13 is performed by the DMA 205 and the disk I/F 208. FIG. 13 illustrates, as an example, a data transfer process combining data transfer 801 from the storage apparatus 209 to the buffer 207 and data transfer 802 from the buffer 207 to the cache memory 206. In addition, the two-step transfer may be performed for any one of the following combinations of data transfer: a combination of the data transfer from the cache memory 206 to the buffer 207 and data transfer from the buffer 207 to the storage apparatus 209, a combination of the data transfer from the host computer 100 to the buffer 207 and the data transfer from the buffer 207 and the cache memory 206, and a combination of the data transfer from the cache memory 206 to the buffer 207 and the data transfer from the buffer 207 to the host computer 100. In the present embodiment, the buffer 207, which is a temporary data storage area for the two-step transfer, is set in a part of a storage area of the cache memory 206. Therefore, the term "cache memory 206" used alone in the present specification indicates a storage area of the cache memory 206 other than the storage area used as the buffer 207.

The following describes in detail a data transfer method selection process for determining which data transfer method to use between the direct transfer and the two-step transfer as the data transfer method for the I/O process to be performed according to the host I/O request from the host computer 100.

Figure 14:
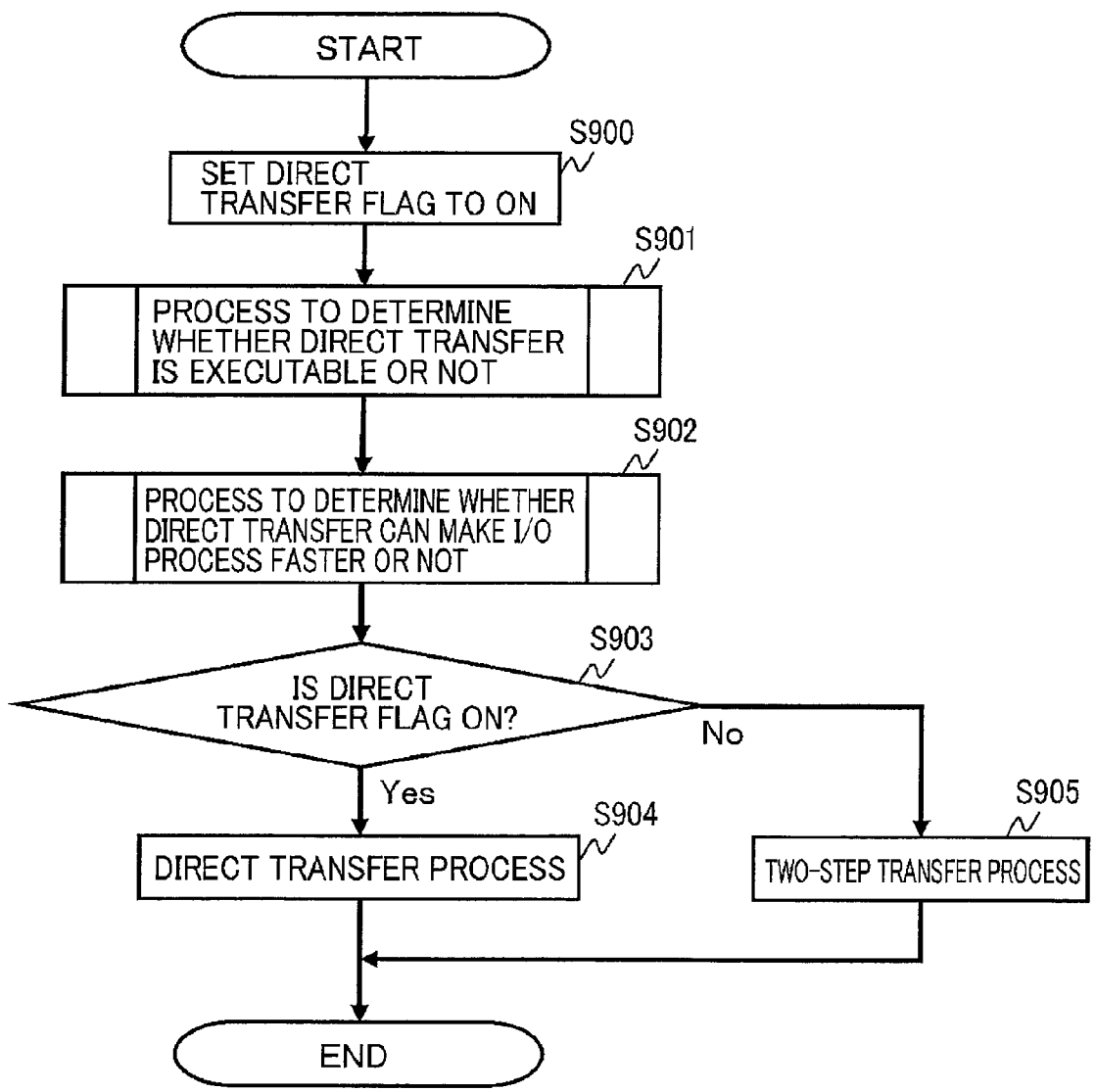
FIG. 14 is a flow chart schematically illustrating a selection process of a data transfer method.

FIG. 14 is a flow chart schematically illustrating the data transfer method selection process. The present embodiment is described with reference to the flow chart of FIG. 14 below. Note that, the flow chart shown in FIG. 14 illustrates an exemplary data transfer method selection process. Therefore, the selection process flow of the data transfer method is not limited to that illustrated in FIG. 14. For example, FIG. 14 uses a dedicated flag (direct transfer flag 600 stored in the local memory 204) to determine whether the direct transfer is performed or not. However, the determination as to whether the direct transfer is performed or not is not limited to the method using the direct transfer flag 600. For example, determinations may be independently performed in subroutines S901 and S902, and the decision as to whether the direct transfer is to be performed or not may be determined on the basis of these determination results. Upon receipt of the host I/O request by the CPU 203, this data transfer selection process is performed by the data transfer method management unit 2041 implemented by the CPU 203. Hereinafter, the sign "S" stands for step.

To begin with, the data transfer method management unit 2041 accesses the local memory 204 and sets the direct transfer flag 600 at ON (S900). Instead of setting the flag by the data transfer method management unit 2041, the initial value of the direct transfer flag 600 may be set at ON. When it is determined to use the two-step transfer during the processes following S901, the direct transfer flag 600 is changed from ON to OFF.

In the subroutine S901 of the data transfer method selection process, it is determined whether the I/O process to be performed according to the instruction of the host computer 100 is executable on the direct transfer or not (i.e., whether the special function of the DMA 205 is necessary or not). When it is determined that the direct transfer is executable, as a result of the determination process, the direct transfer flag is set to OFF. In a case where the determination is performed at the subroutine S902, the process to determine whether direct transfer is executable or not (hereinafter, referred to as a "direct transfer check process") may not be performed.

Next, in the subroutine S902, it is determined whether or not the data transfer process for the I/O process performed according to the instruction of the host computer 100 can be performed at faster speed on the direct transfer than on the two-step transfer. When it is determined that the determination process can be performed at higher speed on the two-step transfer, the direct transfer flag 600 is set to OFF. In the other cases than the above, the direct transfer flag 600 is not changed. Note that, in a case where the determination process is performed at the subroutine S901, the determination process of S902 may be omitted. When it is determined that the direct transfer is not executable at S901, the process at S902 may be skipped.

On the basis of the results of the determination processes performed at the subroutines S901 and S902, the data transfer method is selected (S903). When the direct transfer flag 600 is set at ON as the results of the determination processes at S901 and S902 (S903, Yes), the direct transfer is performed (S904). When the direct transfer flag 600 is set at OFF (S903, No), the two-step transfer is performed (S905).

Figure 15:
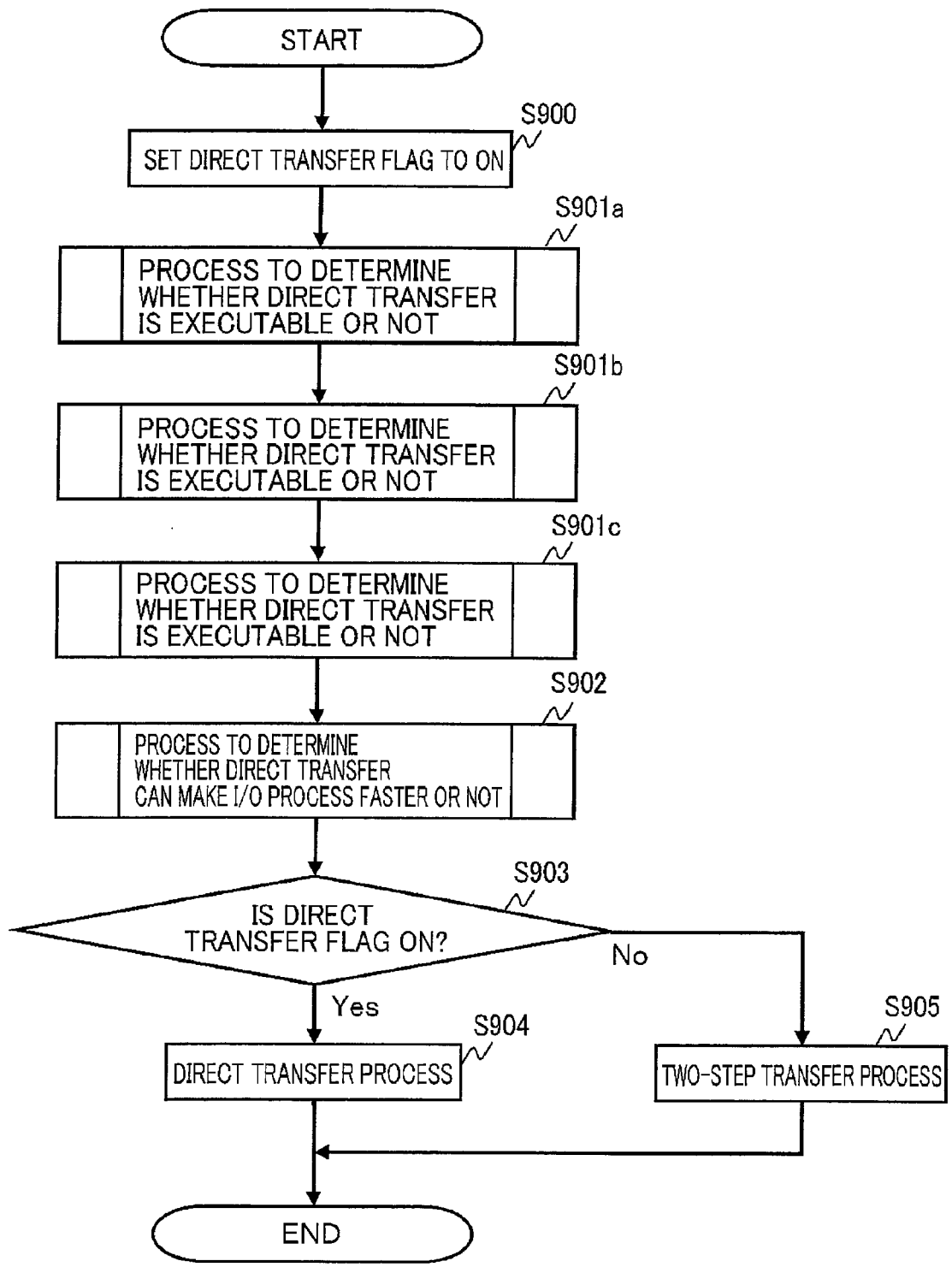
FIG. 15 is a flow chart illustrating an example of another processing method of the selection process of a data transfer method.

FIG. 15 illustrates another exemplary configuration of the data transfer method selection process flow shown in FIG. 14. In FIG. 15, the subroutine S901 corresponding to the process to determine whether direct transfer is executable or not is configured of a combination of multiple determination processes S901a to S901c. The determination process at the subroutine S902 may not be dependent on a single determination process. Instead, the determination process may be dependent on results of a plurality of speedup check processes, and a transfer method that makes the data transfer process the fastest from a comprehensive viewpoint may be selected.

Figure 16:
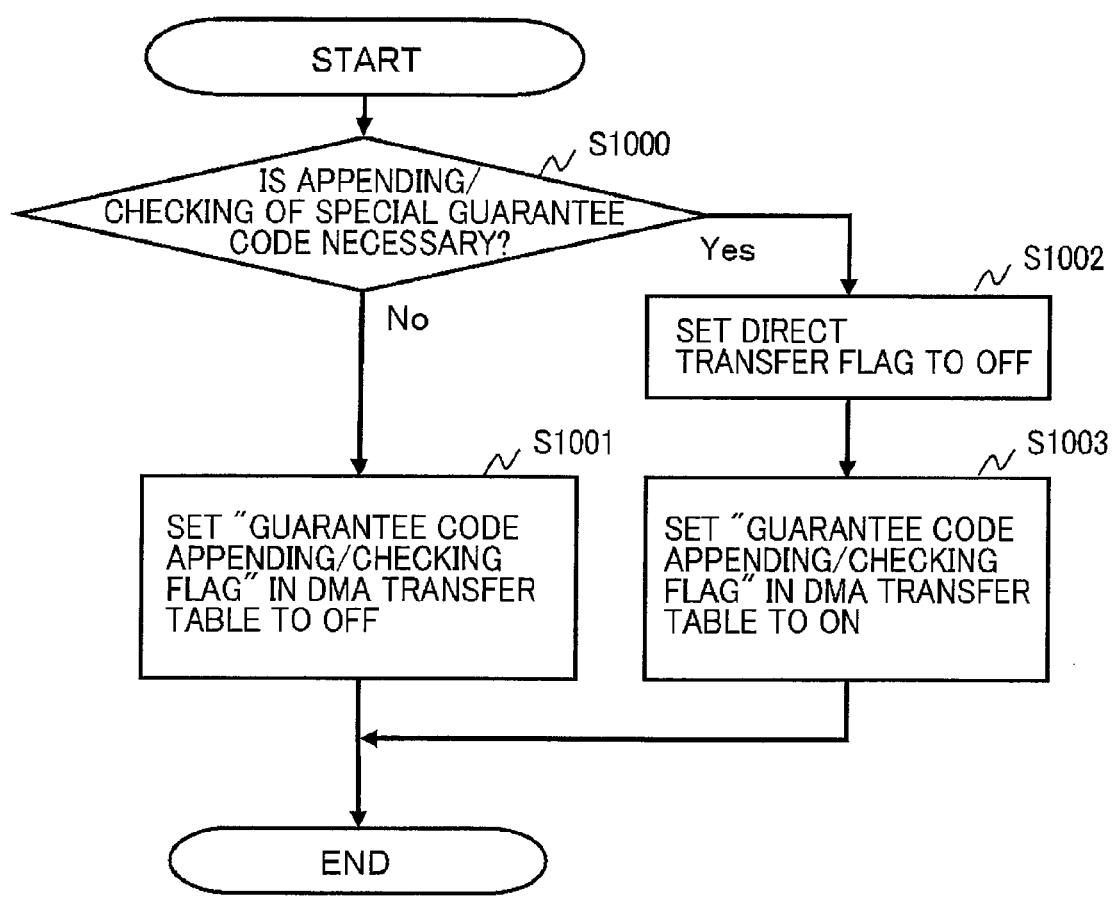
FIG. 16 is a flow chart illustrating an exemplary process of subroutine S901 in FIG. 14.

The following describes details of the direct transfer check process that is performed at the subroutine S901 in FIG. 14. FIG. 16 illustrates an exemplary subroutine S901 to select a data transfer method on the basis of the necessity of the appending/checking of the error detection code. The process at S901 of the present embodiment is described below with reference to the flow chart of FIG. 16. The direct transfer check process may be performed by the data transfer method determination unit 2041 realized by the CPU 203.

An example of an I/O process for which it is determined that the direct transfer is executable at the determination process of the subroutine S901 is an I/O process that involves the DMA 205 appending or checking the special data error detection code that is hard to append or check with a general-purpose protocol chip.

For example, a case using a SATA HDD may not be sufficiently reliable for a storage system storing therein extremely important data. Thus, when the data transfer destination device or data transfer source device is a SATA HDD, two-step transfer is adopted in order to append/check the data error detection code by use of the DMA 205. When the data transfer destination device or data transfer source device is an FC HDD or SAS HDD, the direct transfer can be adopted because, without appending/checking of such a special data error detection code, a sufficient reliability can be secured by only using a error detection code that can be appended/checked using a general-purpose protocol chip.

Further, a transfer method may be selected on the basis of an extent of reliability or the like demanded for the information processing system 1 including the storage system 200. For example, when throughput performance of data transfer is demanded more than reliability of the data itself, the throughput performance of a system can be increased by adopting the direct transfer even if the transfer destination device or transfer source device is a SATA HDD. In contrast, when reliability of the data itself is demanded more than throughput performance, the reliability of a system can be enhanced adopting two-step transfer in order to append/check a data error detection code even if the device is a FC HDD or SAS HDD.

Referring to the exemplary process flow in FIG. 16, the data transfer method determination unit 2042 first determines whether a special error detection code that is performed by the DMA 205 (hereinafter, "special error detection code") needs to be appended/checked (S1000). The necessity of the appending/checking of the special error detection code is determined on the basis of the storage device type information of a transfer destination/source to be set in the transfer type information 302, 402, and 502.

If it is determined that the appending/checking of the special error detection code is unnecessary at S1000 (S1000, No), the data transfer method determination unit 2042 sets the error detection code appending flag 506 or the error detection code checking flag 508 to OFF in the DMA transfer table 500 (S1001). In this case, the direct transfer flag 600 is not changed.

If it is determined that the appending/checking of the special error detection code is necessary (S1000, Yes), the data transfer method determination unit 2042 sets the direct transfer flag 600 to OFF (S1002) and sets the error detection code appending flag 506 or the error detection code checking flag 508 to ON in the DMA transfer table 500 (S1003).

After the process above is completed, the data transfer method determination unit 2042 sets the expectation value of the created error detection code or the error detection code for checking to the error detection code setting value 507 or the error detection code expectation value 509 stored in the DMA transfer table 500. Then, the data transfer method determination unit 2042 appends/checks, upon data transfer with the DMA 205, the special error detection code on the basis of the contents set in the DMA transfer table 500.

Note that, the error detection code that is appended/checked in the flow chart of FIG. 16 is not limited to a single error detection code. For example, when two types of error detection codes are applied, the data transfer method determination unit 2042 may continuously determine whether the appending/checking of each code is necessary or not.

The error detection code may include both a general-purpose error detection code that can be appended/checked with a protocol chip and a special error detection code that can be checked with the DMA 205. For example, if an 8-byte error detection code is to be appended to each 512-byte data, the special error detection code is appended to the most significant byte by the DMA 205 while a different error detection code is appended to the remaining 7 bytes by a protocol chip.

An example of another I/O process for which it is determined that the direct data transfer is not executable at the determination of the subroutine S901 in FIG. 14 is a process in which a specific pattern in data is detected by the DMA 205 (hereinafter, "pattern detection process"). If it is necessary to perform the pattern detection process, the two-step transfer with the DMA 205 is performed. If not necessary, the direct transfer with the CPU 203 is performed. The pattern detection process for data stored in the storage system is, for example, a de-duplication process for eliminating duplicated data, or a zero data detection process for detecting a part where no data is written (space or null) or a part that is filled with zero data in the storage device.

Figure 17:
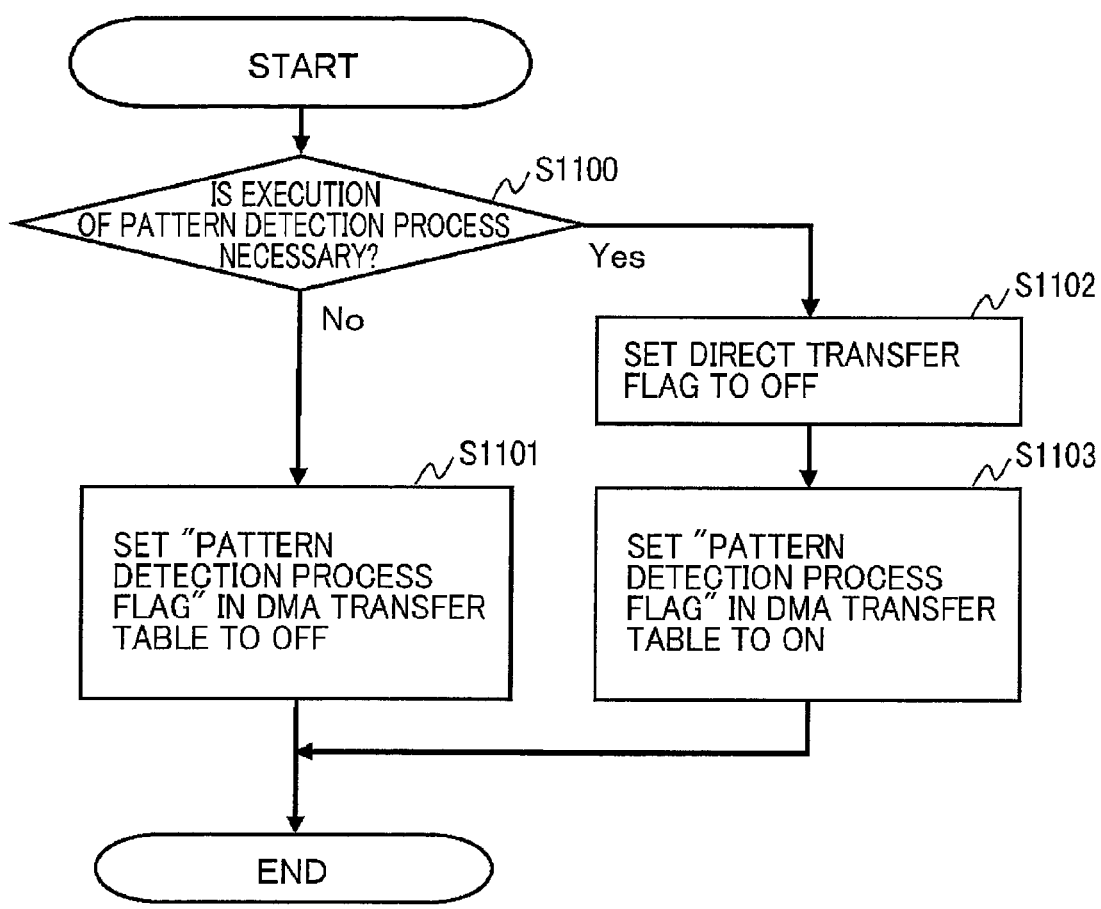
FIG. 17 is a flow chart illustrating another example of the process of subroutine S901 in FIG. 14.

FIG. 17 illustrates an exemplary subroutine S901 of FIG. 14 that is performed by the data transfer method determination unit 2042 to select a data transfer method on the basis of a check result of a pattern detection process. The process at S901 of the present embodiment is described below with reference to the flow chart shown in FIG. 17.

The data transfer method determination unit 2042 determines whether the pattern detection process needs to be performed or not (S1100). Whether the pattern detection process needs to be performed or not is determined, for example, on the basis of the host I/O request including an instruction from the host computer 100.

If it is determined at step S1100 that the execution of the pattern detection process is unnecessary (S1100, No), the data transfer method determination unit 2042 sets the pattern detection process flag 512 to OFF in the DMA transfer table 500 (S1101). In this case, the direct transfer flag 600 is not changed.

If it is determined at step S1100 that the execution of the pattern detection process is necessary (S1100, Yes), the data transfer method determination unit 2042 sets the direct transfer flag 600 to OFF (S1102) and sets the pattern detection process flag 512 to ON in the DMA transfer table 500 (S1103). After the process above is completed, the DMA 205 performs a pattern detection process at an arbitrary timing.

The following describes an example of another I/O process for which it is determined that the direct transfer is not executable in the determination process of the subroutine S901. In this example of "another I/O process," the two-step transfer is performed in case of a dual writing to the cache memory 206 (hereinafter, "cache dual writing") while the direct transfer is performed when the cache dual writing is not necessary.

In order to perform the cache dual writing on the direct transfer, the protocol chips executing the data transfer need to perform data transfer to a plurality of addresses of the cache memory 206. Since a general-purpose protocol chip has no function of setting a plurality of transfer destination addresses in many cases, the two-step transfer of the DMA 205 needs to be performed to realize the cache dual writing.

Figure 18:
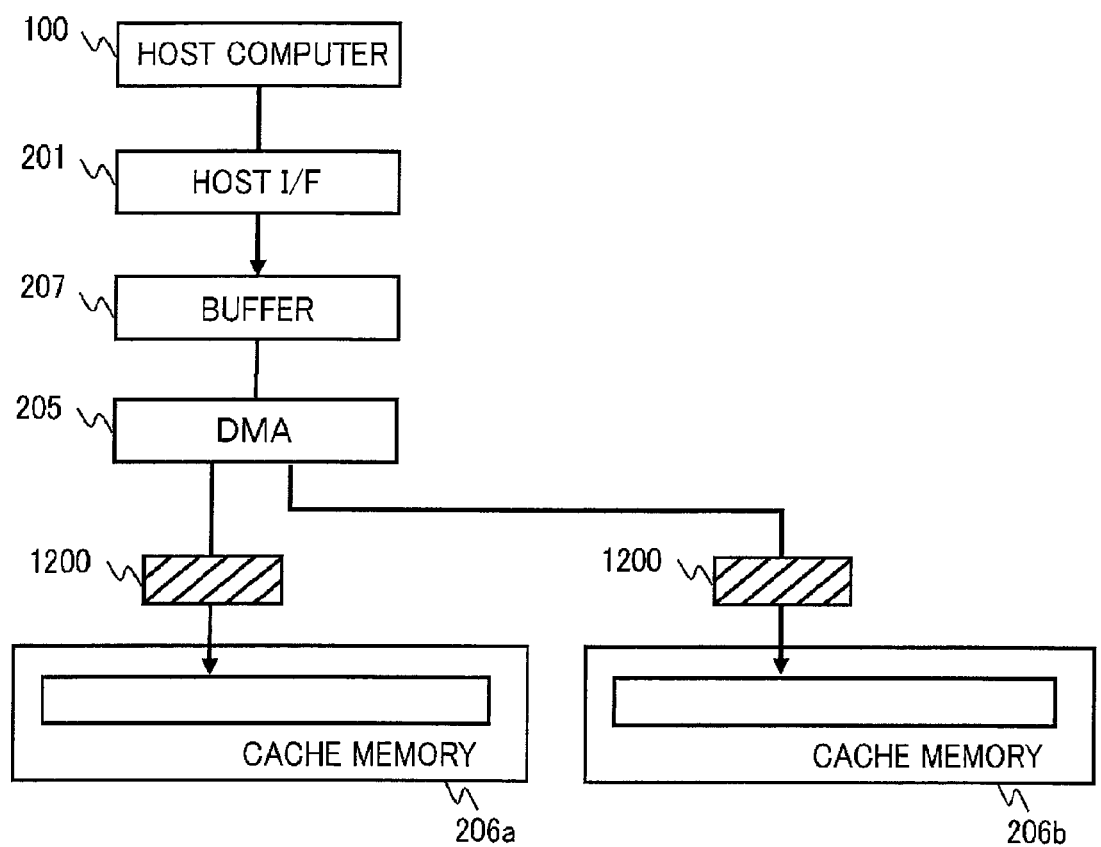
FIG. 18 is a schematic diagram illustrating a data flow where dual writing of data from the host computer 100 to a cache memory 206 is performed.

FIG. 18 illustrates an exemplary schematic diagram of the cache dual writing. The diagram shows how data is transferred from the host computer 100 to the cache memory 206. In the example illustrated in FIG. 18, the cache dual writing is performed when data 1200 is transferred from the host computer 100 to the cache memory 206, so that data is duplicated and written to the cache memory 206 and the reliability of the system is improved. The destination of the data dual writing is either a different address of the same cache memory 206 or an address of a different cache memory 206 on a hardware level.

Figure 19:
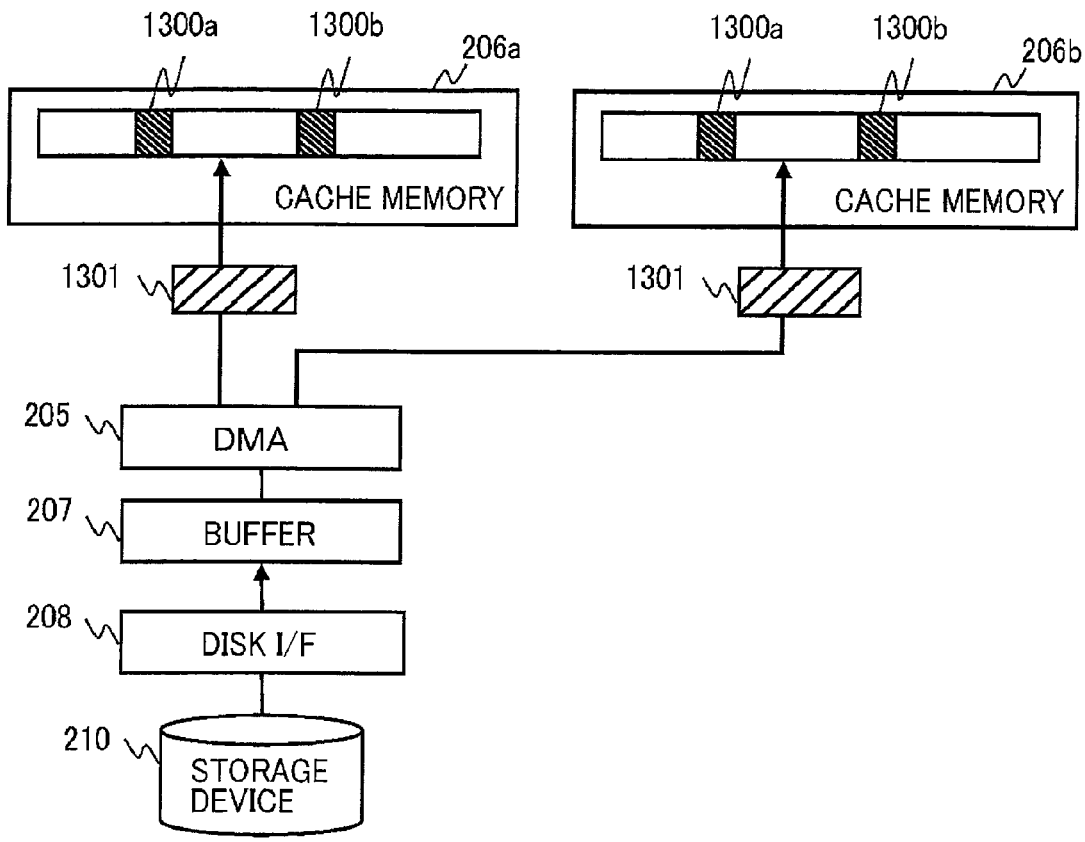
FIG. 19 is a schematic diagram illustrating a data flow where dual writing of data from a storage device 210 to the cache memory 206 is performed.

FIG. 19 illustrates another exemplary schematic diagram of the cache dual writing. The diagram shows how data is transferred from the storage device 210 to the cache memory 206. The case requiring cache dual writing in FIG. 19 is further described below with reference to FIGS. 20 and 21.

Figure 20:
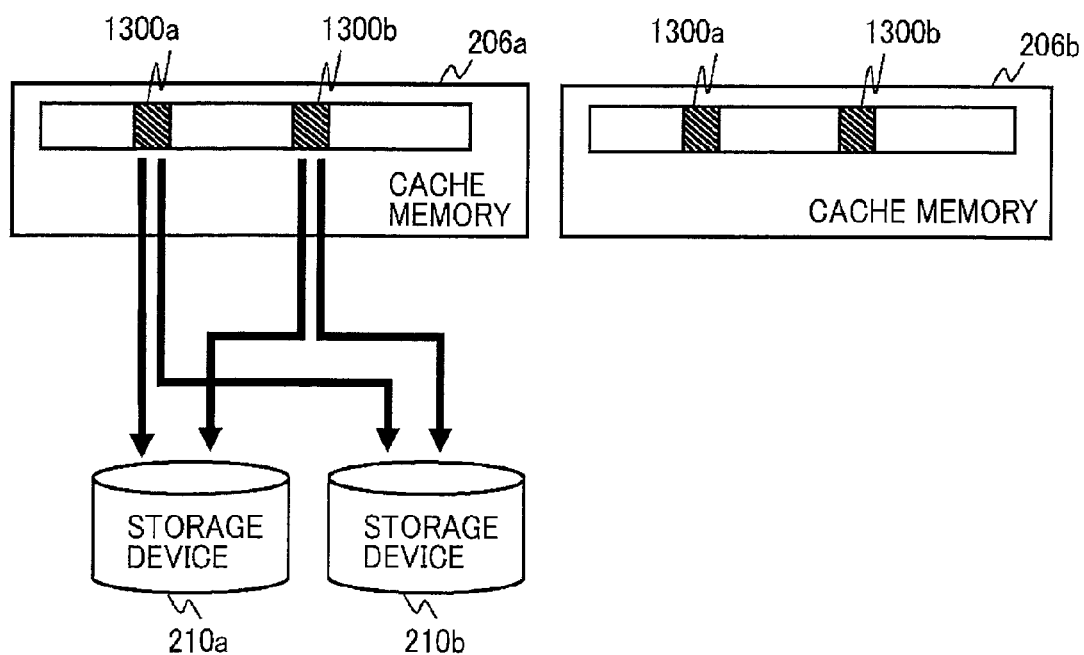
FIG. 20 is a schematic diagram illustrating a data flow where a plurality of dirty data is independently destaged into a plurality of storage devices 210.
Figure 21:
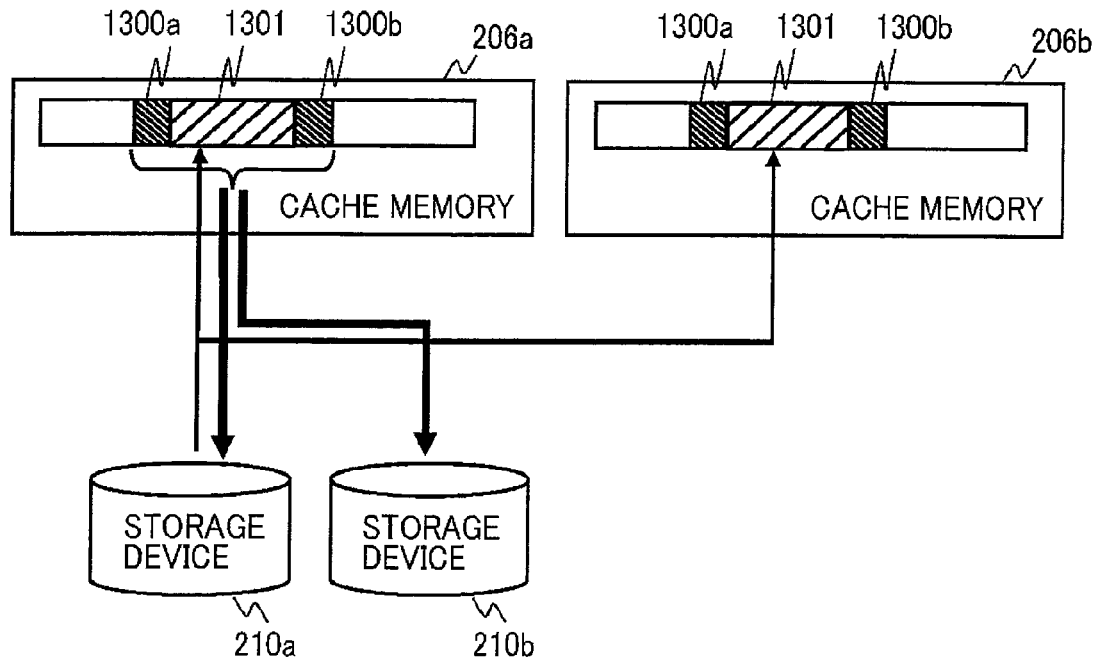
FIG. 21 is a schematic diagram illustrating a data flow where a plurality of dirty data are compensated with staged data and then destaged into a plurality of storage devices 210.

FIGS. 20 and 21 are schematic diagrams showing destage processes of dirty data 1300a and 1300b in the cache memory 206 in the storage system including storage devices 210 (210a and 210b) based on RAID1. The dirty data is data stored in the cache memory 206 and is not yet written to the storage apparatus 209 (storage device 210).

FIG. 20 illustrates a schematic diagram showing a data flow in a case where the dirty data 1300a and 1300b are destaged individually into the storage device 210a and the storage device 210b. In the example illustrated in FIG. 20, the number of accesses to the storage devices 210a and the 210b is four in total.

Meanwhile, in FIG. 21, the CPU 203 checks the state of the cache memory 206 before executing the destage and checks if the spaces among the dirty data, targeted for destage, can be compensated by staging. If the space between the dirty data 1300a and 1300b can be compensated, data 1301 between the dirty data 1300a and 1300b is staged from the storage device 210, and then the dirty data 1300a and 1300b and the staged data 1301 are collectively destaged as shown in FIG. 21. In the example illustrated in FIG. 21, the number of accesses to the storage device 210a and 210b is three in total. Accordingly, the number of accesses to the storage devices 210a and 210b can be reduced as compared with the example illustrated in FIG. 20.

In a case where there is a failure in the cache memory 206a, the function illustrated in FIG. 20 becomes unavailable. Therefore, the cache dual writing is performed to the cache memories 206a and 206b.

Figure 22:
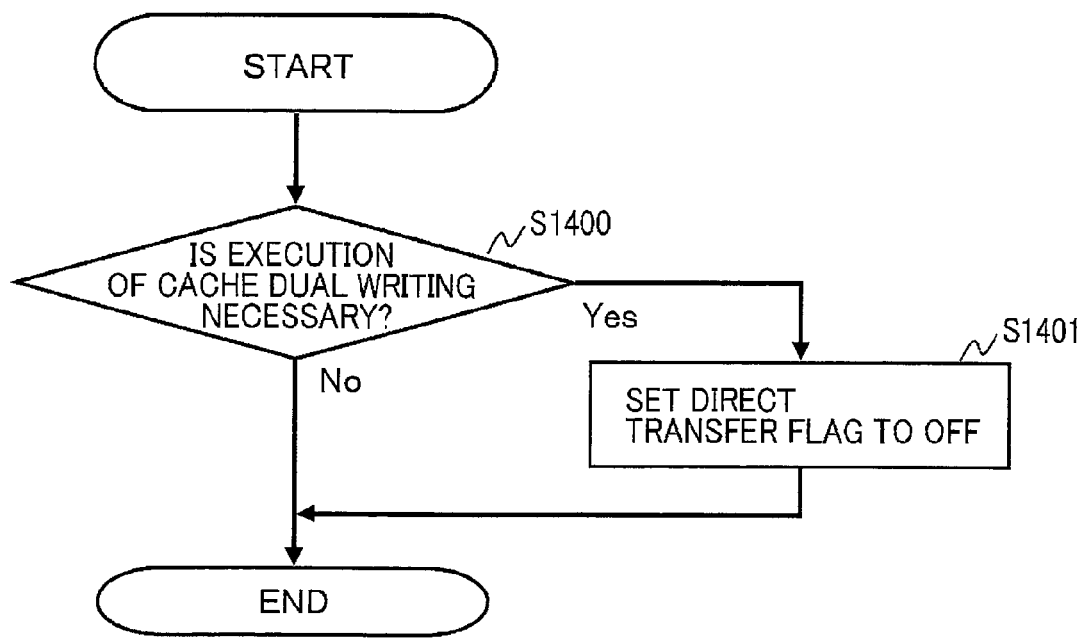
FIG. 22 is a flow chart illustrating another example of subroutine S901 in FIG. 14.

FIG. 22 illustrates an example of the subroutine S901 of FIG. 14 where the data transfer method is selected on the basis of the determination as to whether the execution of the cache dual writing process is necessary or not. The processes at the subroutine S901 in the present embodiment are described with reference to the flow chart of FIG. 22.

The data transfer method determination unit 2042 determines whether the execution of the cache dual writing process is necessary (S1400). Whether the cache dual writing needs to be performed or not is determined, for example, on the basis of the information that is set as the transfer type information 502 in the DMA transfer table 500.

If it is determined that the execution of the cache dual writing is unnecessary at S1400 (S1400, No), the data transfer method determination unit 2042 ends the process without changing the direct transfer flag 600.

If it is determined at S1400 that the execution of the cache dual writing process is necessary (S1400, Yes), the data transfer method determination unit 2042 sets the direct transfer flag 600 to OFF (S1401).

After the process above is completed, data is staged into the addresses of the two cache memories 206 described in the data storage destination addresses in the DMA transfer table 500.

Next, the determination process performed at the subroutine S902 of FIG. 14 is described in detail.

In subroutine 902, an example of the case where the I/O process is determined to be made faster by adopting the two-step transfer process is a case where data to be staged is masked upon staging of the data from the storage apparatus 209 to the cache memory 206 in order that dirty data stored in the cache memory 206 may not be overwritten with the staging data. Such a process is referred to as "bitmap staging," hereinafter.

Figure 23:
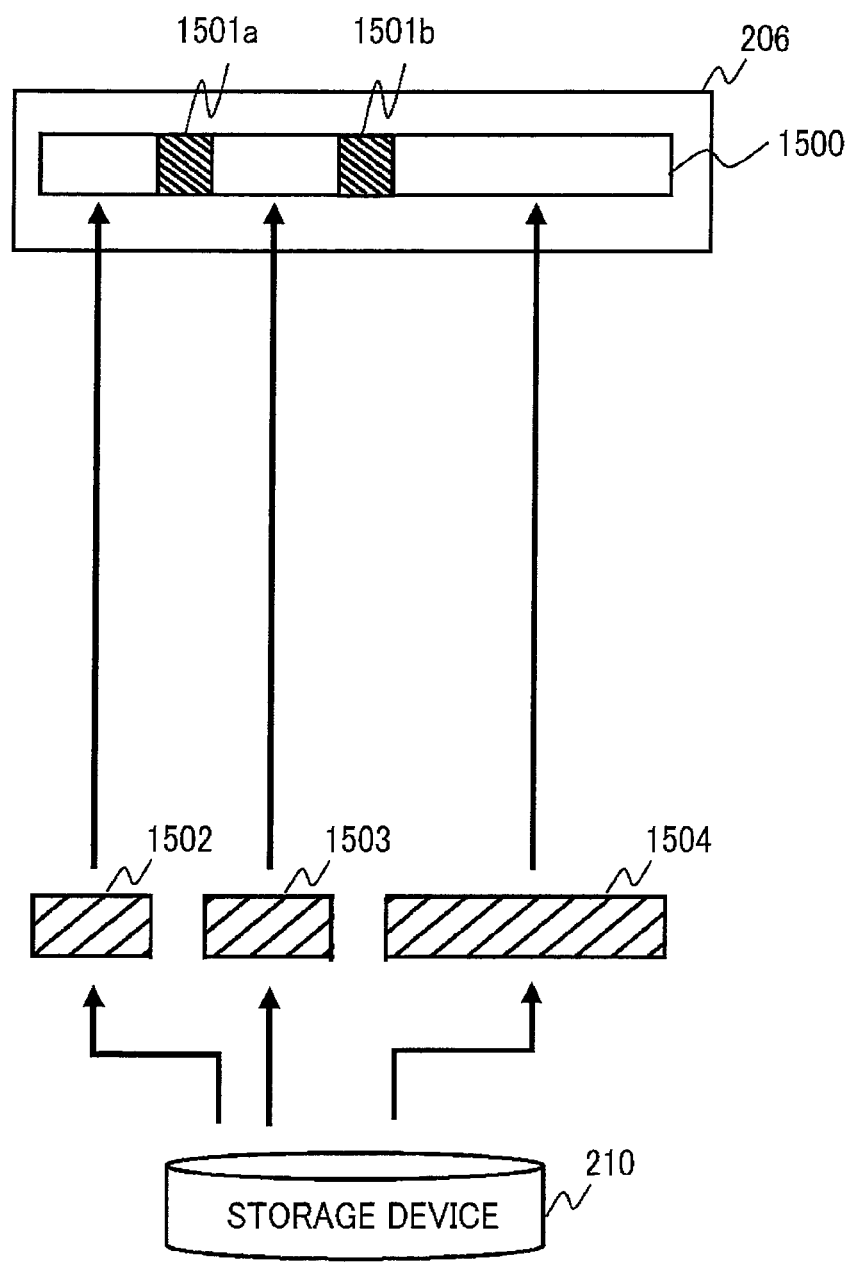
FIG. 23 is a schematic diagram illustrating an exemplary data flow where a staging process is performed on direct transfer, not involving a bitmap staging process.

FIG. 23 illustrates an exemplary schematic diagram of a data flow in a case where the staging is performed on the direct transfer without using the bitmap staging. As illustrated in FIG. 23, a case is considered where the cache segment 1500 on the cache memory 206 stores therein dirty data 1501a and 1501b, and data staging is performed for an area including the area with the dirty data 1501a and 1501b on the cache segment 1500.

When the data is staged on the direct transfer, the staging needs to be performed in a manner such that the area storing the dirty data 1501a and 1501b is avoided and not overwritten. Accordingly, plural times of an I/O process needs to be performed for the storage device 210. In the example of FIG. 23, the staging data 1502, 1503 and 1504 need to be independently staged from the storage device 210. In general, the I/O performance of the storage device 210 is three to four orders of magnitude lower than that of main memory. Thus, the data I/O process to the storage device 210 in such case becomes a bottleneck and there is fear that this would lead to a reduction in the system performance.

Figure 24:
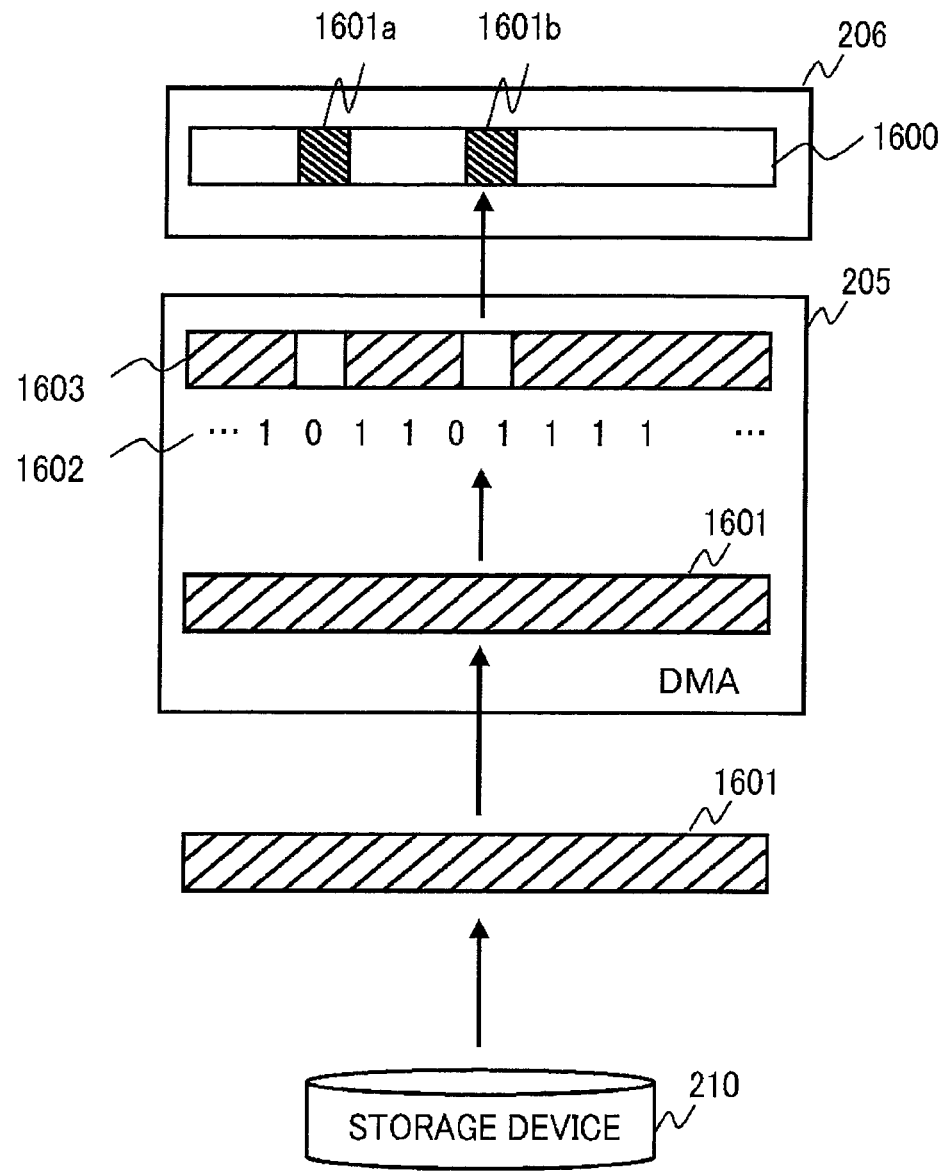
FIG. 24 is a schematic diagram illustrating an exemplary data flow where a staging process is performed on two-step transfer, involving a bitmap staging process.

FIG. 24 illustrates an exemplary schematic diagram of a data flow in a case where staging to the cache memory 206 is performed on the two-step transfer with the bitmap staging. As illustrated in FIG. 24, a bitmask 1602 is created from the bitmap indicating the location of the dirty data 1601a and 1601b inside the cache segment 1600 to be staged, and then the data 1603, which is obtained by applying the bitmask 1602 to the data 1601 read from the storage device 210, is staged into the cache segment 1600 of the cache memory 206. As a result, the number of I/O processes to the storage device 210 can be minimized, and the system throughput can be increased.

Figure 25:
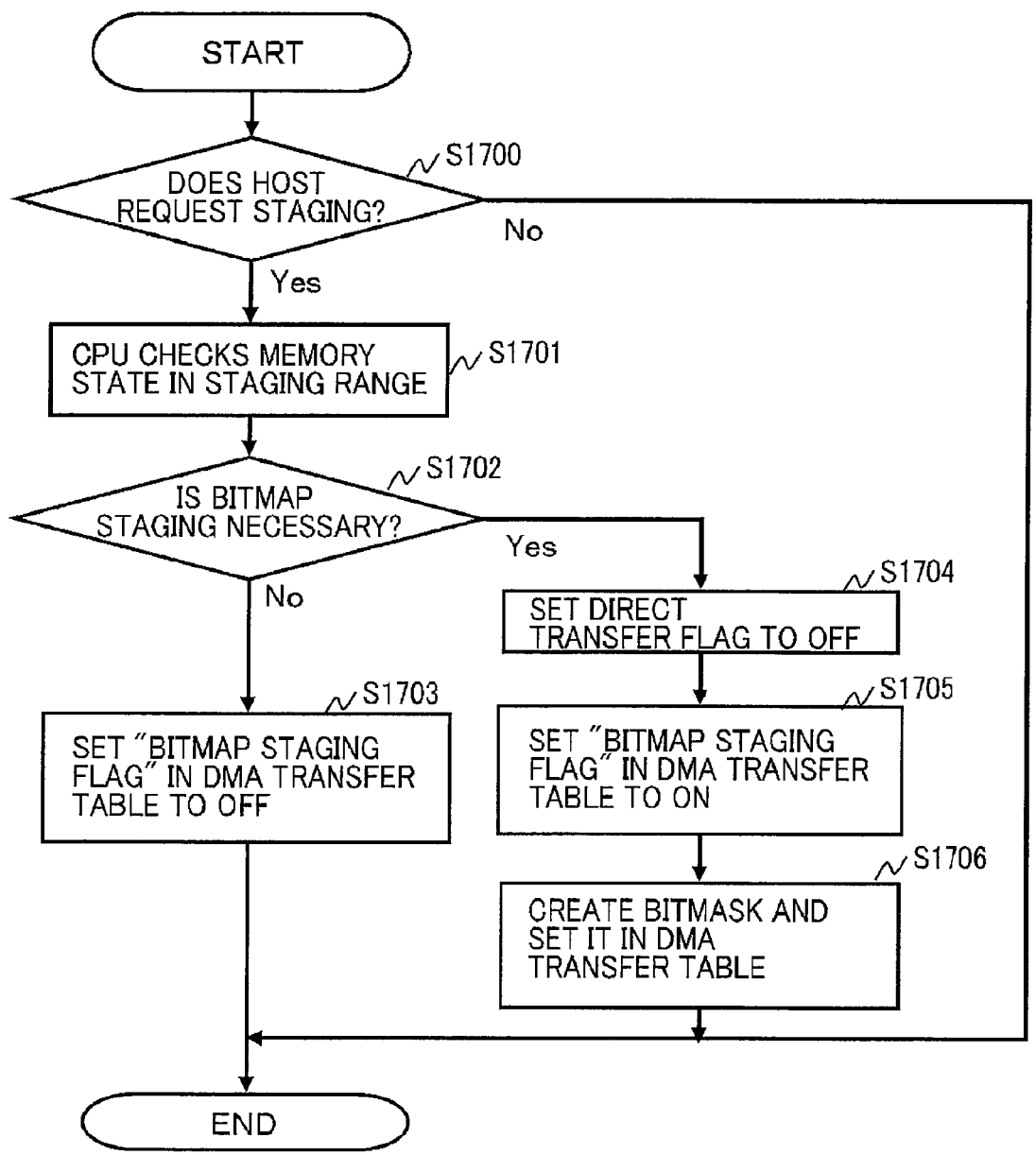
FIG. 25 is a flow chart illustrating an exemplary subroutine S902 in FIG. 14.

FIG. 25 illustrates an exemplary subroutine S902 of FIG. 14 that is performed to select a data transfer method on the basis of the determination result as to whether the execution of the bitmap staging process is necessary or not. The subroutine S902 of the present embodiment is described below with reference to the flow chart illustrated in FIG. 25.

The data transfer method determination unit 2042 determines whether the host I/O request from the host computer 100 is a staging process or not (S1700). The type of the host I/O request from the host computer 100 is determined, for example, on the basis of the transfer type information 302 that is set in the host I/F transfer table 300.

If it is determined that the contents of the host I/O request from the host computer 100 are not a staging request (S1700, No), the bitmap staging process is not performed. Thus, the process S902 is finished at this moment in this case. If it is determined that the content of the host I/O request from the host computer 100 is a staging request (S1700, Yes), the data transfer method determination unit 2042, which is realized by the CPU 203, checks the state of the address range in the cache memory 206 for which the stating process is to be performed and then creates the bitmap for the address range (S1701). The bitmap may be created in advance at any suitable timing before the execution of S1701. Next, the data transfer method determination unit 2042 determines whether the execution of the bitmap staging process is necessary or not on the basis of the bitmap created at S1701 (S1702).

If it is determined at S1702 that the execution of the bitmap staging process is unnecessary (S1702, No), the data transfer method determination unit 2042 sets the bitmap staging flag 510 to OFF in the DMA transfer table 500 (S1703). In this case, the direct transfer flag 600 is not changed.

If it is determined at S1702 that the execution of the bitmap staging process is necessary (S1702, Yes), the data transfer method determination unit 2042 sets the direct transfer flag 600 to OFF (S1704) and sets the bitmap staging flag 510 to ON (S1705) in the DMA transfer table 500. On the basis of the bitmap created at S1701, the data transfer method determination unit 2042 creates a bitmask and sets the same in the bitmask setting value 511 in the DMA transfer table 500 (S1706).

After the process above is completed, the bitmask setting value 511 in the DMA transfer table 500 is applied to mask the data within the address range to be staged, and the staging is performed by the DMA 205.

Further, the necessity of the execution of the bitmap staging process may be determined on the basis of the load on the cache memory 206 and the buffer 207, the I/O performance of the storage device 210 and the like. For example, in a situation where the load on the cache memory 206 is very heavy, the execution of the bitmap staging process on the two-step transfer may provide lower throughput performance than the staging on the direct transfer. In such a case, a configuration can be made so that the direct transfer may be performed regardless of whether the dirty data is stored in the cache segment for the staging or not. In actual operation, a threshold for the load on the cache memory 206 can be set beforehand and used in the following configuration, for example. If the load on the cache memory 206 is equal to or below the threshold, whether the bitmap staging process is needed or not is performed normally in the manner described above. If the load on the cache memory 206 is above the threshold for the cache memory 206, the bitmap staging flag 510 is always set to OFF.

If the storage device 210 for staging is a device, such as an SSD, that can achieve a high speed I/O process in a situation even when the memory load is not very heavy, the time taken for executing an I/O process on direct data transfer for the storage device 210 a plurality of times is possibly shorter than the period of time taken for the bitmap staging process on the two-step transfer. In such a case, the direct transfer is performed without the bitmap staging process.

Figure 26:
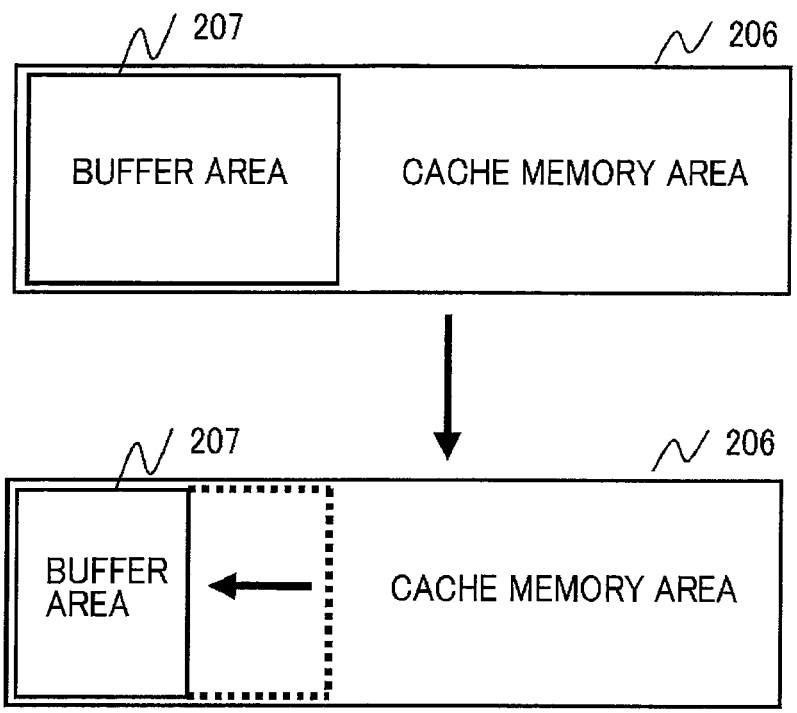
FIG. 26 is a schematic diagram illustrating how a part of a buffer area 207 is changed into an area of the cache memory 206.

In the present embodiment, the memory area or bandwidth allocated in the buffer 207 may be increased or decreased depending on the processing in execution, the state of the storage system 200 and the like. For example, if a large portion of a data transfer method is direct transfer and some of the capacity and bandwidth allocated in the buffer 207 are not in use, less capacity and bandwidth may be allocated to the buffer 207 while the free capacity and bandwidth, obtained by allocating less capacity and bandwidth, may be allocated to the cache memory 206 to increase the I/O performance. FIG. 26 is a schematic diagram illustrating how a part of the capacity and bandwidth of the buffer 207 is allocated to the cache memory 206.

Figure 27:
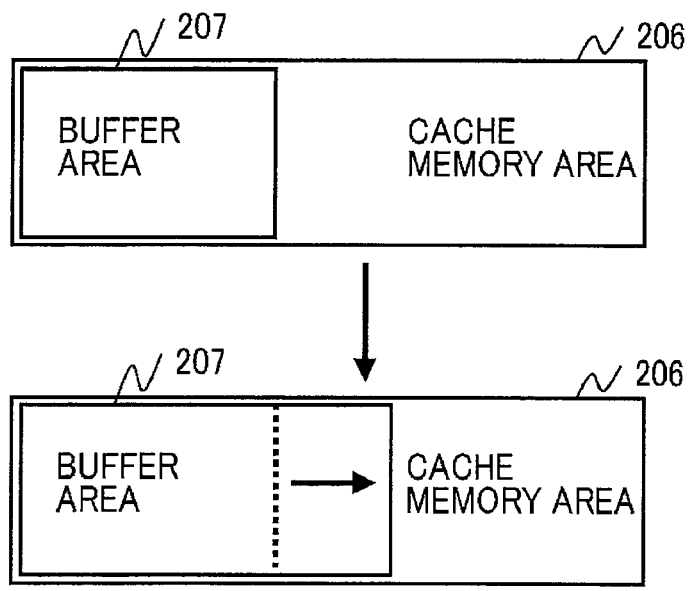
FIG. 27 is a schematic diagram illustrating how a part of an area of the cache memory 206 is changed into the buffer area 207.

In contrast, if some of capacity and bandwidth allocated to the cache memory 206 are not in use, more capacity and bandwidth may be allocated to the buffer 207 from the cache memory 206 to increase the I/O performance similarly. FIG. 27 is a schematic diagram illustrating how a part of the area and capacity of the cache memory 206 is allocated to the buffer 207.

The storage system 200 may be configured in a manner such that these data transfer method selection processes are automatically performed in accordance with a determination method previously set when the storage system 200 is designed. Alternatively, the management apparatus 110 may notify, via the management I/F 211, the storage system 200 (the data transfer method management unit 2401 that is realized by the CPU 203 in particular) of the determination method being set by a system administrator on the basis of conditions such as I/O performance, reliability and the like, so that the determination method is applied.

The following describes an exemplary method of changing the reference for selecting the data transfer method in response to an instruction from the management apparatus 110.

Figure 28:
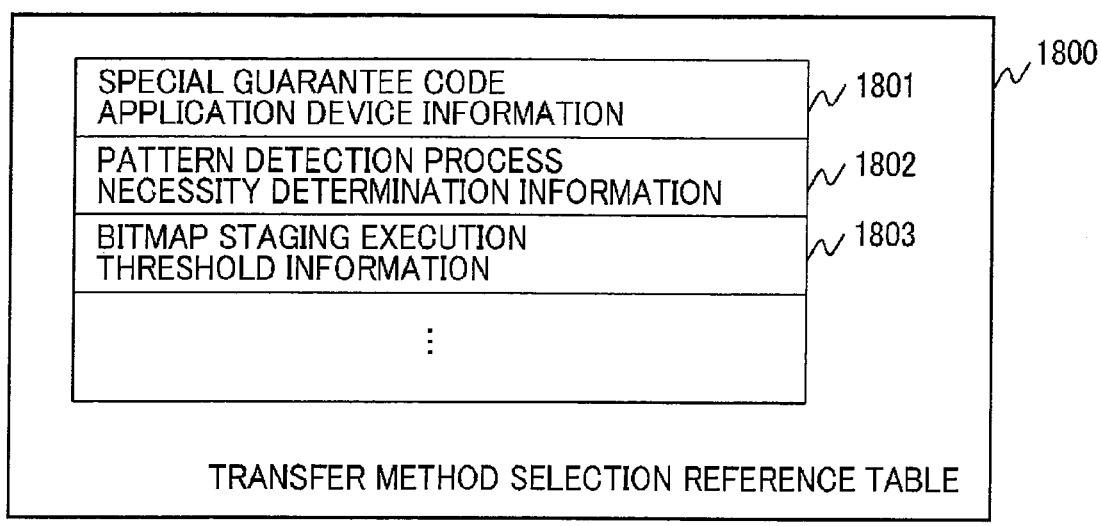
FIG. 28 illustrates an exemplary transfer method selection reference table 1800 that stores therein reference information for selecting a data transfer method.

FIG. 28 illustrates an exemplary table storing therein information serving as the reference for selecting a data transfer method (hereinafter, "transfer method selection reference table"). To begin with, the CPU 203 creates a transfer method selection reference table 1800 in advance and stores the same in a non-volatile storage area such as the storage device 210. When the power of the storage system 200 is turned on, the CPU 203 (e.g., the data transfer method management unit 2401) reads the transfer method selection reference table 1800 and stores the same in the storage area such as the local memory 204 that can be accessed by the CPU 203. Upon receipt of an instruction from the management apparatus 110, the CPU 203 rewrites, according to the instruction from the management apparatus 110, special error detection code application device information 1801 or the like stored in the transfer method selection reference table 1800. At the time of data transfer, the data transfer method management unit 2401 refers to the transfer method selection reference table 1800 and then creates the host I/F transfer table 300, the disk I/F transfer table 400 or the DMA transfer table 500. When the power is turned off, the data transfer method management unit 2401, which is realized by CPU 203, stores the transfer method selection reference table 1800 in a non-volatile storage area such as the storage device 210.

The transfer method selection reference table 1800 may store therein the following pieces of information such as: the special error detection code application device information 1801, which is information indicating device types for which it is determined that the appending/checking of the special error detection code is necessary at S1000 in FIG. 16; pattern detection process flag 1802 indicating whether the pattern detection process in FIG. 17 is to be performed or not or which pattern detection process is to be performed; and the bitmap staging execution threshold information 1803 indicating a threshold for the load on the cache memory 206 determining that the bitmap staging is unnecessary at S1702 in FIG. 25.

Second Embodiment

Next, the second embodiment of the present invention is described with reference to FIGS. 29 to 31.

In the first embodiment, the embodiment of the present invention is realized with the single storage system 200. On the other hand, the second embodiment relates to the I/O processes performed among multiple storage systems 200.

Note that, the second embodiment is a variation of the first embodiment. Thus, the following describes the configuration of the second embodiment while focusing on the difference between the second embodiment and the first embodiment.

Figure 29:
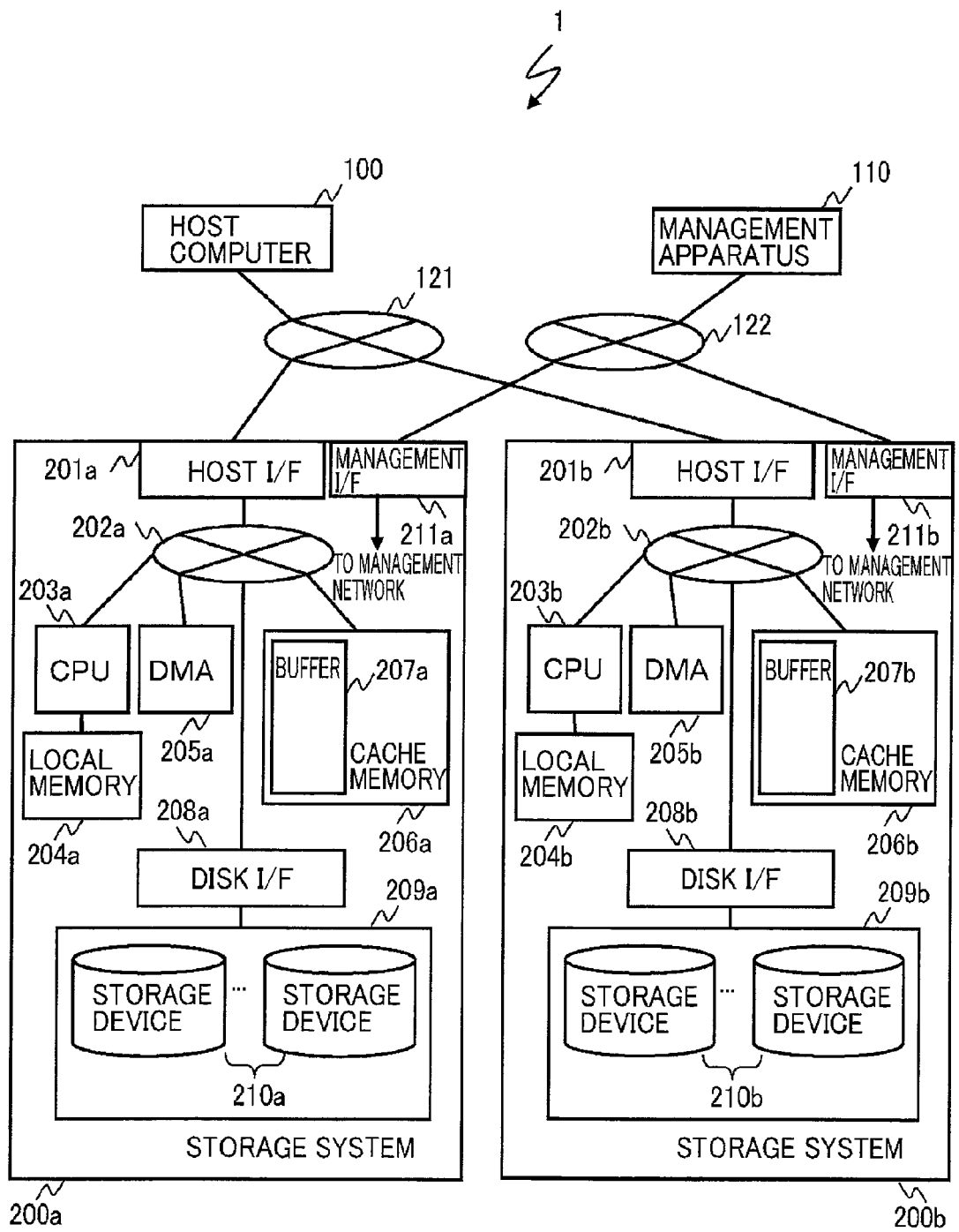
FIG. 29 illustrates an exemplary configuration of an information processing system 1 including storage systems 200a and 200b to which the present invention is applied.

FIG. 29 illustrates a configuration of an information system 1 of the second embodiment. The configuration shown in FIG. 29 illustrates an outline of the present invention to an extent that the present invention can be understood and realized. The scope of the present invention is not limited to the configuration illustrated in FIG. 29.

The host computer 100 is mutually coupled with the storage systems 200*a* and 200*b* via the communication network 121 such as a SAN (Storage Area Network). The management apparatus 110 is mutually coupled with the storage system 200*a* and 200*b* via the communication network 122 such as a LAN (Local Area Network). In FIG. 29, the host I/F 201*a* performs, in addition to the functions illustrated in the first embodiment, data transfer with the storage system 201*b* that is mutually coupled therewith via the communication network 121. Similarly, the host I/F 201*b* included in the storage system 200*b* performs, in addition to the functions illustrated in the first embodiment, data transfer with the storage system 201*a* that is mutually coupled therewith via the communication network 121. The functions of the other components in FIG. 29 are the same as those in the first embodiment, and therefore the descriptions of these functions are omitted below.

The number of the storage systems 200, coupled with the communication networks 121 and 122, may be three or more. In addition, when the information system 1 is configured as illustrated in FIG. 29 in the second embodiment, the I/O processes in the storage system 200*a* or 200*b* may adopt any of the methods described in the first embodiment.

The second embodiment is described below with reference to a flow chart in FIG. 14 of the first embodiment. When data is copied between the storage systems 200*a* and 200*b* for data backup purpose (hereinafter, this data copy is referred as a "remote copy"), a error detection code needs to be appended to the transfer data in order to detect or correct errors in the data transfer between the storage systems 200*a* and 200*b*. For example, as an operation form of an actual storage system, considered is a case where, when a new model of a storage product is to be installed, an old model of the same series may be used as a backup storage and the like. In this case, a error detection code supported by a general-purpose protocol chip of the new model is not always supported by a general-purpose protocol chip of the old model. Therefore, a unique error detection code which doesn't dependent on a general-purpose protocol chip needs to be used.

In the present embodiment, when a remote copy is performed between the separate storage systems 200*a* and 200*b*, and the remote copy is performed between the storage systems 200*a* and 200*b* having the host I/Fs 201 of the same configuration, the direct transfer can be performed between the storage systems 200*a* and 200*b* by employing the error detection code that can be appended and checked by the respective host I/Fs 201. Accordingly, as described above, in the case that the same error detection code can be used by a pair of the storage systems 200*a* and 200*b* using the same host I/Fs 201, the direct transfer can be performed between the storage systems 200*a* and 200*b* to reduce a load on the memory, and in the other cases, the two-step transfer can be performed between the storage systems 200*a* and 200*b*. In order to use a same error detection code with DMAs 205*a* or 205*b* in both new and old storage systems 200*a* and 200*b*, two-step transfer is performed using the DMAs 205*a* and 205*b*. In this case, the system is configured in a manner such that it is determined that that direct transfer is not executable, in the determination process at the subroutine S901 in FIG. 14.

Figure 30:
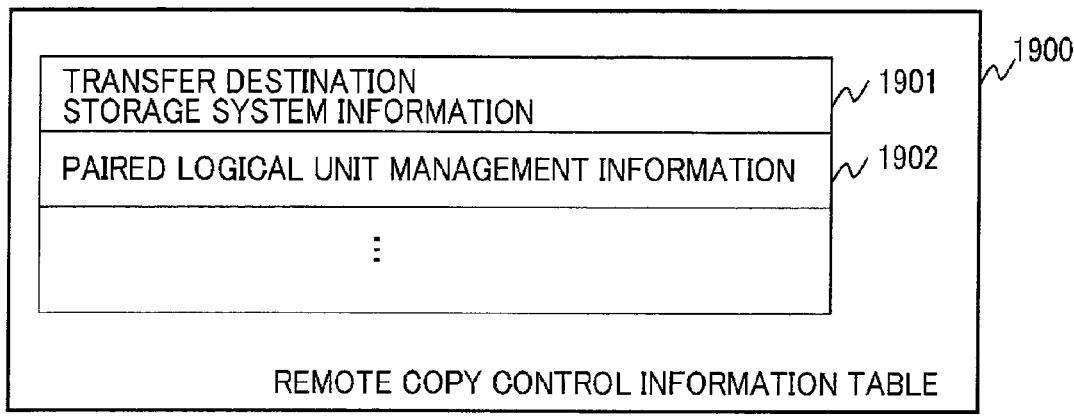
FIG. 30 illustrates an exemplary remote-copy control information table 1900 that stores therein control information used for a remote copy.

FIG. 30 illustrates an exemplary remote copy control information table 1900 storing therein the transfer information used for the remote copy. To perform the remote copy, the CPU 203 refers to the remote copy control information table 1900 and performs data transfer.

The remote copy control information table 1900 is stored in a storage area that the CPU 203 can refer to in the local memory 204 or the like. Transfer destination storage system information 1901 stores therein information on the storage systems 200*a* and 200*b* of the transfer destination. Paired logical unit management information 1902 stores therein information of paired logical units, which are a logical unit in the storage system of the transfer source and a logical unit in the storage system of the transfer destination.

Figure 31:
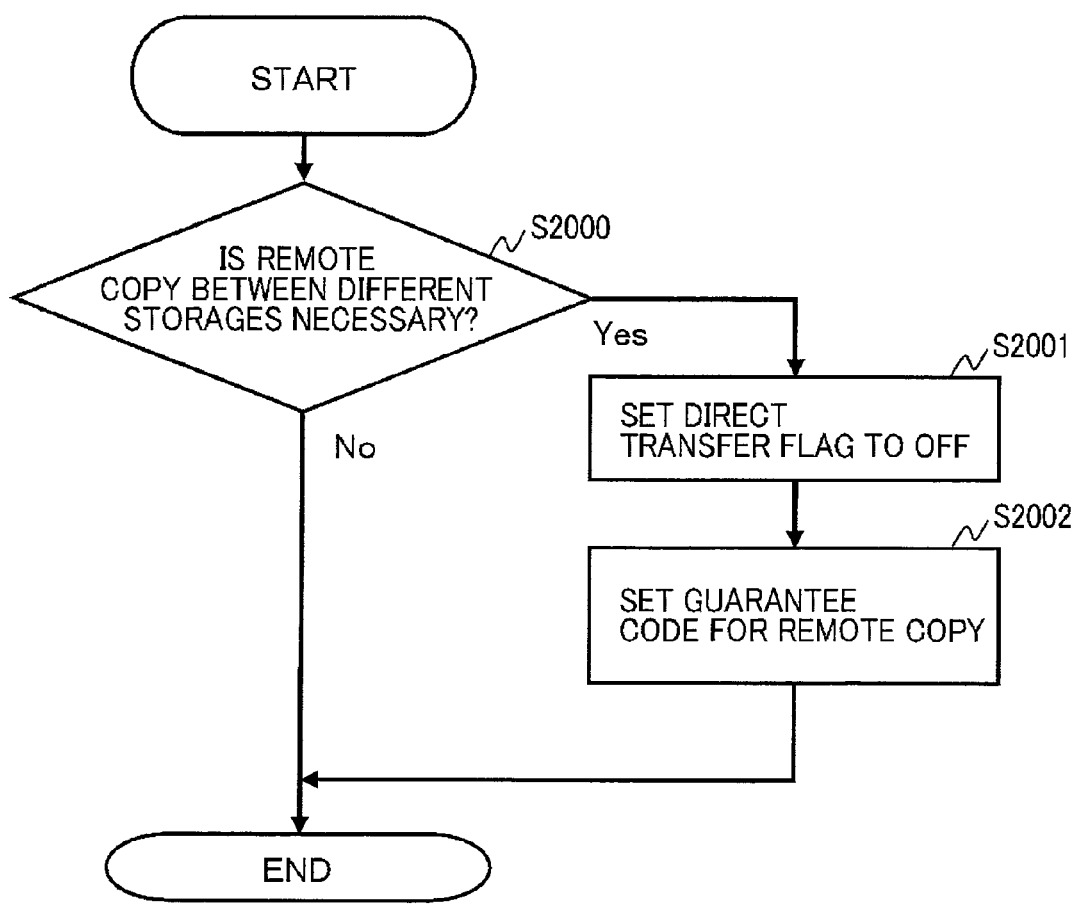
FIG. 31 is a flow chart illustrating an exemplary subroutine S901 in FIG. 14 when the subroutine S901 is applied to the configuration in FIG. 29.

FIG. 31 illustrates an exemplary subroutine S901 of FIG. 14 performed to select a data transfer method on the basis of copy destination address information upon the remote copy. The processes of S901 in the second embodiment are described below with reference to a flow chart in FIG. 31.

A data transfer method determination unit 2042 realized by the CPU 203 determines, based on the copy destination address information included in the host I/O request from the host computer 100, whether the execution of a remote copy between the storage systems 200*a* and 200*b* is necessary or not (S2000).

If it is determined at step S2000 that the execution of the remote copy between the storage systems 200*a* and 200*b* is unnecessary (S2000, No), the process is completed at this moment and the direct transfer flag 600 is not changed.

Meanwhile, if it is determined at step S2000 that the execution of the remote copy between the storage systems 200*a* and 200*b* is necessary (S2000, Yes), the data transfer method determination unit 2042 sets the direct transfer flag 600 to OFF (S2001), and sets the error detection code in the remote copy destination storage system (S2002). The error detection code is stored, for example, in the DMA transfer table 500. When the remote copy is performed in the actual operation, the DMA 205*a* or 205*b* refers to the error detection code and appends the error detection code.

As described in detail above, according to the embodiment of the present invention, the direct transfer or the two-step transfer is selected depending on determination result on the necessity of a data process involved in the data transfer in the storage system 200, e.g., the necessity of appending/checking and the like of a special error detection code, and determination result as to whether the process for speeding up the data I/O process, such as a bitmap staging is executable or not. Thus, the performance of data I/O process can be improved even when the performance of the storage device 210 and hardware resources such as the capacity and the like of the cache memory 206 are limited. Furthermore, even when the remote copy process is performed between two or more storage systems 200, the direct transfer or the two-step transfer is selected similarly to a case where a single storage system 200 is used. Thus, the performance of data I/O process can be improved.

Note that, the present invention is not limited to the first embodiment or the second embodiment described above and includes various variations. For example, the embodiments above aim to describe the present invention in a detailed and comprehensive way. Accordingly, all the components described in the embodiments are not necessarily required. In addition, a part of the configuration of one embodiment may replace a configuration of another embodiment. Further, a part of the configuration of one embodiment may additionally include a configuration of another embodiment. Further, a part of the configuration of each embodiment may be added/removed/replaced to or from another embodiment. The configurations illustrated in figures aim to merely illustrate a scope that is needed for explanation and do not illustrate all the configurations required for achieving the actual product.

The invention claimed is:

1. A storage system, comprising:
a storage apparatus storing data used by an external apparatus;
first and second temporary data storage units temporarily storing data read from the storage apparatus; and
a controller,
wherein, in the case that data read from the storage apparatus is transferred to the first temporary data storage unit on the basis of an I/O request from the external apparatus, the controller is configured to select one of a first data transfer process and a second data transfer process on the basis of the I/O request,
wherein, in the first data transfer process, the storage system is configured to execute data transfer from the storage apparatus to the first temporary data storage unit, and
wherein, in the second data transfer process, the storage system is configured to execute data transfer from the storage apparatus to the second temporary data storage unit and data transfer from the second temporary data storage unit to the first temporary data storage unit.

2. The storage system according to claim 1,
wherein, in the case that data read from the storage apparatus is transferred to the first temporary data storage unit on the basis of an I/O request from the external apparatus, the controller is configured to select one of the first data transfer process and the second data transfer process on the basis of a status of the first temporary data storage unit.

3. The storage system according to claim 2,
wherein the controller is configured to select the second data transfer process when dirty data is stored in a transfer destination area of the first temporary data storage unit.

4. The storage system according to claim 1, further comprising:
a disk interface being configured to execute the data transfer from the storage apparatus to the first temporary data storage unit in the first data transfer process; and
a host interface being configured to execute data transfer from the first temporary data storage unit to the external apparatus.

5. The storage system according to claim 1, further comprising:
a disk interface being configured to execute the data transfer from the storage apparatus to the second temporary data storage unit in the second data transfer process;

a data transfer controller being configured to execute the data transfer from the second temporary data storage unit to the first temporary data storage unit in the second data transfer process; and
a host interface being configured to execute data transfer from the first temporary data storage unit to the external apparatus.

6. The storage system according to claim 5,
wherein the data transfer controller is configured to perform a data process; and
wherein the controller is configured to select the second data transfer process when the controller determines to perform the data process on the basis of the I/O request.

7. A storage system, comprising:
a storage apparatus storing data used by an external apparatus;
first and second temporary data storage units temporarily storing data read from the storage apparatus; and
a controller,
wherein, in the case that data read from the first temporary data storage unit is transferred to the external apparatus on the basis of an I/O request from the external apparatus, the controller is configured to select one of a first data transfer process and a second data transfer process on the basis of the I/O request,
wherein, in the first data transfer process, the storage system is configured to execute data transfer from the first temporary data storage unit to the external apparatus, and
wherein, in the second data transfer process, the storage system is configured to execute data transfer from the first temporary data storage unit to the second temporary data storage unit and data transfer from the second temporary data storage unit to the external apparatus.

8. The storage system according to claim 7, further comprising a host interface being configured to execute the data transfer from the first temporary data storage unit to the external apparatus in the first data transfer process.

9. The storage system according to claim 7, further comprising:
a data transfer controller being configured to execute the data transfer from the first temporary data storage unit to the second temporary data storage unit in the second data transfer process; and
a host interface being configured to execute the data transfer from the second temporary data storage unit to the external apparatus in the second data transfer process.

10. The storage system according to claim 9,
wherein the data transfer controller is configured to perform a data process; and
wherein the controller is configured to select the second data transfer process when the controller determines to perform the data process on the basis of the I/O request.

11. A storage system, comprising:
a storage apparatus storing data used by an external apparatus;
first and second temporary data storage units temporarily storing write data from the external apparatus; and
a controller,
wherein, in the case that write data from the external apparatus is transferred to the first temporary data storage unit on the basis of an I/O request from the external apparatus, the controller is configured to select one of a first data transfer process and a second data transfer process on the basis of the I/O request, wherein, in the first data transfer process, the storage system is configured to execute data transfer from the external apparatus to the first temporary data storage unit, and wherein, in the second data transfer process, the storage system is configured to execute data transfer from the external apparatus to the second temporary data storage unit and data transfer from the second temporary data storage unit to the first temporary data storage unit.

12. A storage system, comprising:

a storage apparatus storing data used by an external apparatus;

first and second temporary data storage units temporarily storing write data from the external apparatus; and a controller, wherein, in the case that write data from the first temporary data storage unit is transferred to the storage apparatus on the basis of an I/O request from the external apparatus, the controller is configured to select one of a first data transfer process and a second data transfer process on the basis of the I/O request, wherein, in the first data transfer process, the storage system is configured to execute data transfer from the first temporary data storage unit to the storage apparatus, and wherein, in the second data transfer process, the storage system is configured to execute data transfer from the first temporary data storage unit to the second temporary data storage unit and data transfer from the second temporary data storage unit to the storage apparatus.

* * * * *